(12) United States Patent
Han et al.

(10) Patent No.: US 12,422,270 B2
(45) Date of Patent: Sep. 23, 2025

(54) TRAFFIC CONGESTION SENSING METHOD AND APPARATUS, ELECTRONIC DEVICE AND STORAGE MEDIUM

(71) Applicant: UISEE (SHANGHAI) AUTOMOTIVE TECHNOLOGIES LTD., Shanghai (CN)

(72) Inventors: Zuoyue Han, Shanghai (CN); Zihan Wang, Shanghai (CN)

(73) Assignee: UISEE (SHANGHAI) AUTOMOTIVE TECHNOLOGIES LTD., Shanghai (CN)

( * ) Notice: Subject to any disclaimer, the term of this patent is extended or adjusted under 35 U.S.C. 154(b) by 0 days.

(21) Appl. No.: 18/031,954

(22) PCT Filed: Oct. 14, 2020

(86) PCT No.: PCT/CN2020/120896
§ 371 (c)(1),
(2) Date: Jun. 28, 2023

(87) PCT Pub. No.: WO2022/077266
PCT Pub. Date: Apr. 21, 2022

(65) Prior Publication Data
US 2025/0146833 A1 May 8, 2025

(51) Int. Cl.
*G07C 5/04* (2006.01)
*G01C 21/36* (2006.01)
(Continued)

(52) U.S. Cl.
CPC ........... *G01C 21/3691* (2013.01); *G07C 5/04* (2013.01); *G08G 1/0112* (2013.01);
(Continued)

(58) Field of Classification Search
CPC .... G01C 21/3691; G07C 5/04; G08G 1/0112; G08G 1/0129; G08G 1/0133; G08G 1/04;
(Continued)

(56) References Cited

U.S. PATENT DOCUMENTS 6,133,825 A * 10/2000 Matsuoka .............. B60Q 9/008
340/436
2014/0358413 A1 12/2014 Trombley et al.
(Continued)

FOREIGN PATENT DOCUMENTS

CN 105788256 A 7/2016
CN 109466551 A 3/2019
(Continued)

*Primary Examiner* — Brian A Zimmerman
*Assistant Examiner* — Anthony D Afrifa-Kyei
(74) *Attorney, Agent, or Firm* — Bayramoglu Law Offices L.L.C

(57) ABSTRACT

A method and a device for sensing a traffic congestion, electronic equipment and a storage medium are provided. The method for sensing the traffic congestion includes: acquiring driving environment information including lane line information of a lane in which a host vehicle is located, host vehicle driving information, and vehicle information of surrounding vehicles; determining a driving path of the host vehicle based on the lane line information and the host vehicle driving information; determining an effective vehicle on at least one side of the host vehicle from the surrounding vehicles based on the host vehicle driving path and the vehicle information of the surrounding vehicles; and determining a current congestion state of a corresponding lane based on vehicle information of the effective vehicle on at least one side of the host vehicle and a historical congestion state of the corresponding lane.

16 Claims, 7 Drawing Sheets

(51) Int. Cl.
*G08G 1/01* (2006.01)
*G08G 1/04* (2006.01)
*G08G 1/052* (2006.01)

(52) U.S. Cl.
CPC ......... *G08G 1/0129* (2013.01); *G08G 1/0133* (2013.01); *G08G 1/04* (2013.01); *G08G 1/052* (2013.01)

(58) Field of Classification Search
CPC .............. G08G 1/052; G08G 1/0962; G08G 1/096708; G08G 1/167; B60W 60/0011; B60W 60/00; B60W 60/001; B60W 60/0017; B60W 30/16; B60W 30/165; B60W 30/12; B60W 30/182; B60W 40/06; B60W 60/0025; B60W 60/0027; B60W 2520/10; B60W 2520/105; B60W 2520/14; B60W 2552/53; B60W 2552/00; B60W 2554/4045; B60W 2554/80; B60W 2754/20; B60W 30/18163; B60W 30/10; B60W 10/06; B60W 10/184; B60W 10/00; B60W 10/18; B60W 10/188; B60W 10/192; B60W 10/20; B60W 50/14; B60W 2050/146; B60W 2554/802; B60W 2554/804; B60W 2555/60; B60W 2710/20; B60W 2720/10; B60W 2754/30; B60K 2310/30; B62D 6/00; B62D 6/001; B62D 6/002; B62D 6/007; B62D 6/008; B62D 6/02; B62D 6/04; B62D 6/06; B62D 6/08; B62D 5/0463; B62D 15/00; B62D 15/025; B62D 15/026; G05D 1/0212; G05D 1/0219; G05D 1/0287; G06V 20/588; G01S 2013/9316; G01S 2013/9318; G01S 2013/93185; G01S 2013/9319; G01S 2013/932; G01S 2013/9321; G01S 2013/9323; G01S 2013/9324; G01S 2013/9325
See application file for complete search history.

(56) References Cited

U.S. PATENT DOCUMENTS

| | | |
|---|---|---|
| 2017/0076598 A1 | 3/2017 | Scofield et al. |
| 2017/0169711 A1* | 6/2017 | Baek ...................... G08G 1/166 |
| 2018/0113450 A1* | 4/2018 | Sherony .......... B60W 30/18163 |
| 2020/0180636 A1 | 6/2020 | Oh et al. |

FOREIGN PATENT DOCUMENTS

| | | |
|---|---|---|
| CN | 110163039 A | 8/2019 |
| CN | 110816540 A | 2/2020 |
| CN | 110969837 A | 4/2020 |
| CN | 111583668 A | 8/2020 |
| CN | 111619566 A | 9/2020 |
| CN | 111738207 A | 10/2020 |
| DE | 102010051244 A1 | 6/2011 |
| JP | 2009214838 A | 9/2009 |
| JP | 2009286274 A | 12/2009 |
| JP | 2014029324 A | 2/2014 |
| JP | 2014158726 A | 9/2014 |
| JP | 2015076078 A | 4/2015 |
| JP | 2015158468 A | 9/2015 |
| JP | 6449627 B2 | 1/2019 |
| JP | 2019016082 A | 1/2019 |
| JP | 2022036726 A | 3/2022 |
| JP | 2023131775 A | 9/2023 |
| KR | 20180052811 A | 5/2018 |

\* cited by examiner

TRAFFIC CONGESTION SENSING METHOD AND APPARATUS, ELECTRONIC DEVICE AND STORAGE MEDIUM

CROSS REFERENCE TO THE RELATED APPLICATIONS

This application is the national phase entry of International Application No. PCT/CN2020/120896, filed on Oct. 14, 2020, the entire contents of which are incorporated herein by reference.

TECHNICAL FIELD

The present disclosure relates to the field of traffic technology, and more particularly, to a method and a device for sensing a traffic congestion, electronic equipment and a storage medium.

BACKGROUND

With the development of automatic driving technique, autonomous vehicles have gradually evolved from achieving specific driving functions for a short time in a simple scene to achieving long-distance point-to-point transportation capability. In long distance transportation, autonomous lane change according to destination orientation is inevitable. Therefore, the ability of the automatic driving system to imitate the driving habits of human drivers to change lanes according to chances is essential when there are multiple vehicles on the driving lane or even congestion occurs.

Currently, congestion detection methods rely on a large amount of road infrastructure and other vehicle data, require a powerful central system, and have poor real-time performance. The generated congestion information is highly correlated with the road, but not strongly correlated with the driving needs of a single vehicle (such as driving road segments), resulting in the failure of congestion detection on some road segments.

SUMMARY

(I) The Technical Problem to be Solved

The technical problem to be solved by the present disclosure is to solve the problem of poor pertinence of existing congestion detection.

(II) Technical Solution

In order to solve the above technical problem, embodiments of the present disclosure provide a method and a device for sensing a traffic congestion, electronic equipment and a storage medium.

A first aspect of an embodiment of the present disclosure provides a method for sensing a traffic congestion comprising:
  acquiring driving environment information including lane line information of a lane in which a host vehicle is located, host vehicle driving information, and vehicle information of surrounding vehicles;
  determining a driving path of the host vehicle based on the lane line information and the host vehicle driving information;
  determining an effective vehicle on at least one side of the host vehicle from the surrounding vehicles based on the host vehicle driving path and the vehicle information of the surrounding vehicles; and
  determining a current congestion state of a corresponding lane based on vehicle information of the effective vehicle on at least one side of the host vehicle and a historical congestion state of the corresponding lane.

A second aspect of an embodiment of the present disclosure provides a device for sensing a traffic congestion comprising:
  an environment information acquisition unit configured for acquiring driving environment information including lane line information of a lane in which a host vehicle is located, host vehicle driving information, and vehicle information of surrounding vehicles;
  a driving path determination unit configured for determining a driving path of the host vehicle based on the lane line information and the host vehicle driving information;
  an effective vehicle determination unit configured for determining an effective vehicle on at least one side of the host vehicle from the surrounding vehicles based on the host vehicle driving path and the vehicle information of the surrounding vehicles; and
  a congestion state determination unit configured for determining a current congestion state of a corresponding lane based on vehicle information of the effective vehicle on at least one side of the host vehicle and a historical congestion state of the corresponding lane.

A third aspect of an embodiment of the present disclosure provides an electronic equipment comprising:
  a memory and one or more processors;
  wherein the memory is communicatively connected to the one or more processors; the memory stores instructions executable by the one or more processors; and when the instructions are executed by the one or more processors, the electronic equipment is used for implementing the method for sensing the traffic congestion according to embodiments of the present disclosure.

A fourth aspect of an embodiment of the present disclosure provides a computer-readable storage medium having stored thereon computer-executable instructions that, when executed by a computing device, are operable to implement the method for sensing the traffic congestion according to each embodiment of the present disclosure.

(III) Beneficial Effects

The above-mentioned technical solutions provided by the embodiments of the present disclosure have the following advantages compared with the prior art.

The technical solution of the present disclosure can determine an effective vehicle on at least one side of the host vehicle based on driving environment information, and further determine a current congestion state of a corresponding lane based on the vehicle information of the effective vehicle on at least one side of the host vehicle and a historical congestion state of the corresponding lane thereof, so as to achieve the sensing of a real-time congestion state of an adjacent lane on the left side and/or the right side of the host vehicle. The sensing result is highly targeted, and can provide a better service for the driving (especially automatic driving) of the host vehicle.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

In order to explain the embodiments of the present disclosure or the technical solutions in the prior art more clearly, the following simple description will be given to the drawings which are used in the embodiments or the description of the prior art. It would be obvious for a person skilled in the art to obtain other drawings according to these drawings without involving any inventive effort.

DETAILED DESCRIPTION OF THE EMBODIMENTS

Figure 1:
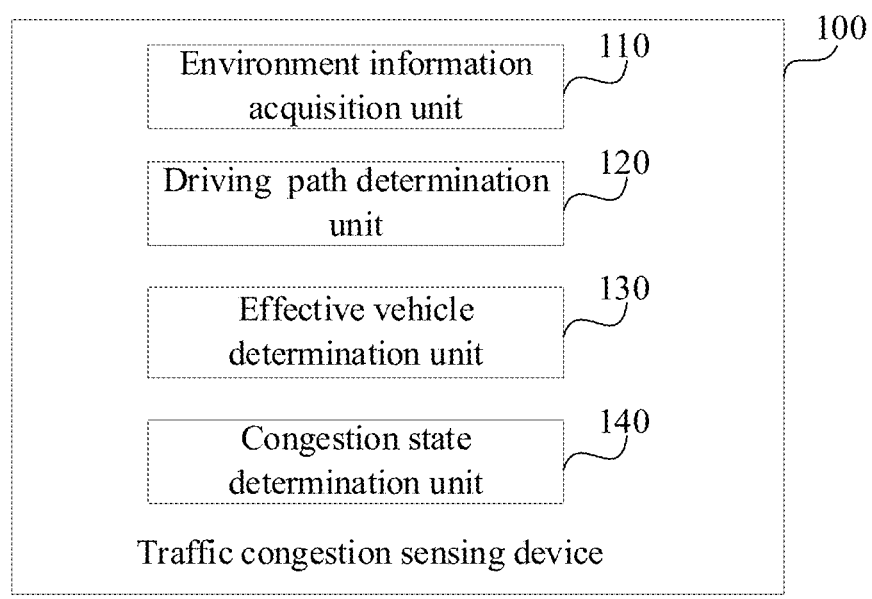
FIG. 1 is a block diagram of a functional module of a device for sensing a traffic congestion according to an embodiment of the present disclosure.

In order that the above-mentioned objects, features and advantages of the present disclosure may be more clearly understood, a further description of the aspects of the present disclosure is provided below. It should be noted that the embodiments and the features in the embodiments in the present disclosure may be combined with one another without conflicts.

In the following description, numerous specific details are set forth in order to provide a thorough understanding of the present disclosure, but the present disclosure may be practiced otherwise than as specifically described herein. It should be understood that the embodiments in the specification are only a few embodiments of the present disclosure, not all embodiments.

In the following detailed description, numerous specific details are set forth by way of example in order to provide a thorough understanding of the relevant disclosure. However, it will be apparent to one of ordinary skill in the art that the present disclosure may be practiced without these details. It should be understood that the use of the terms "system", "device", "unit", and/or "module" in the present disclosure serve for a method for distinguishing between different levels of components, elements, portions, or components in a sequential arrangement. However, these terms may be replaced by other expressions if they achieve the same purpose.

As used in this disclosure, the term "and/or" includes any and all combinations of one or more of the associated listed items.

The terminology used in the present disclosure is for the purpose of describing particular embodiments only and is not intended to limit the scope of the present disclosure. As used in the description and the claims of this disclosure, the words "a", "an", and/or "the" are not intended to refer to the singular and may include the plural unless the context clearly dictates otherwise. In general, the terms "comprises" and "comprising" are used exclusively to indicate that the referenced features, integers, steps, operations, elements, and/or components are included, but do not constitute an exclusive list. Other features, integers, steps, operations, elements, and/or components also may be included therein.

These and other features and characteristics, the method of operation, the functions of the related elements of structure, the combination of parts, and the economy of manufacture of the present disclosure may be better understood with reference to the following description and the accompanying drawings, which form a part of this specification. It should be expressly understood, however, that the drawings are directed for the purpose of illustration and description only and are not intended as a definition of the limits of the present disclosure. It will be appreciated that the drawings are not drawn to scale.

The technical solution of the present disclosure is mainly used for a vehicle to sense or detect congestion states of lanes on two adjacent sides thereof so as to provide an effective and reliable basis for a vehicle lane change. In some embodiments, the vehicle includes a conventional vehicle (a vehicle that supports only manual driving) and an unmanned vehicle. In the following embodiments of the present disclosure, an unmanned vehicle will be described as an example.

Figure 2:
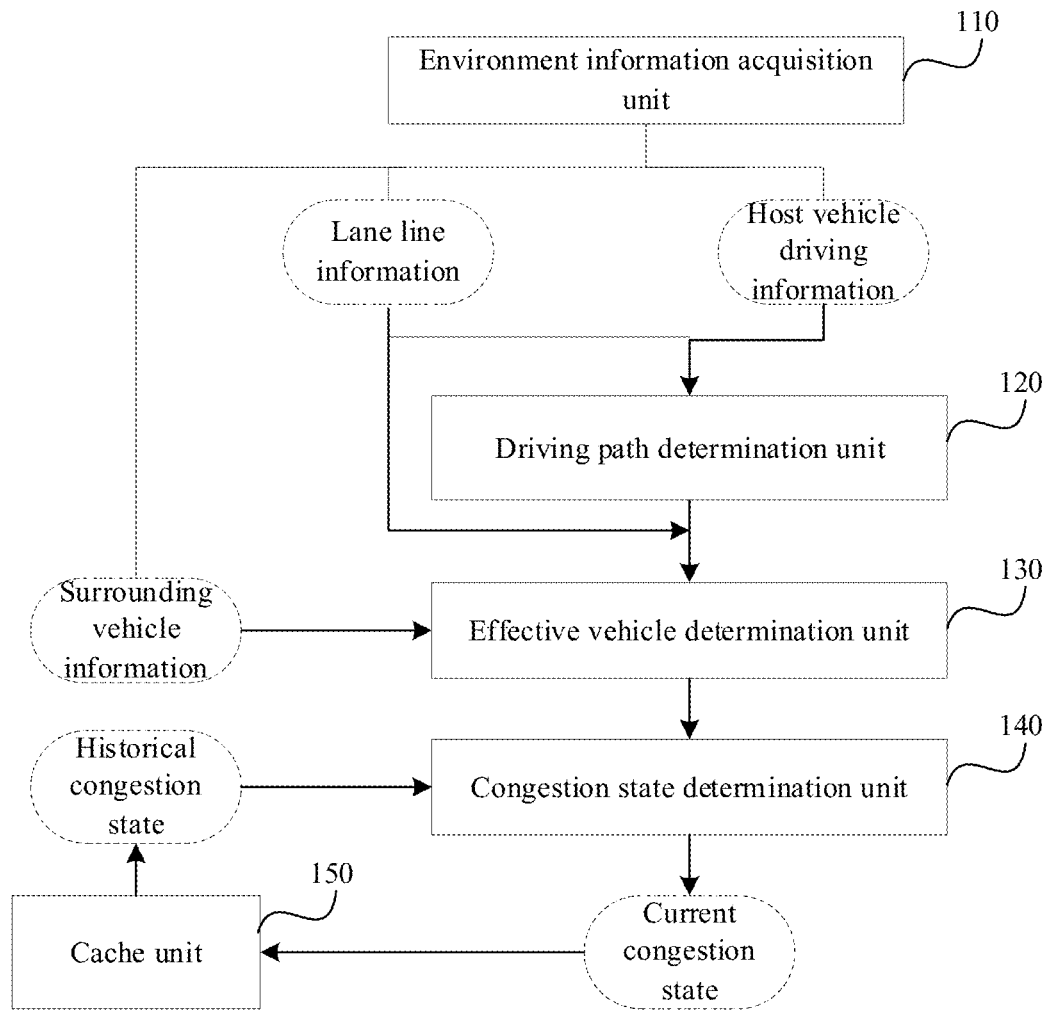
FIG. 2 is a schematic diagram of a functional module of a device for sensing a traffic congestion according to an embodiment of the present disclosure.

FIG. 1 shows a block diagram of a functional module of a device for sensing a traffic congestion. FIG. 2 shows a schematic diagram of a functional module of a device for sensing a traffic congestion. As shown in FIGS. 1 and 2, the device 100 for sensing a traffic congestion includes an environmental information acquisition unit 110, a driving path determination unit 120, an effective vehicle determination unit 130, and a congestion state determination unit 140.

Among them, the environment information acquisition unit 110 is configured for acquiring driving environment information including lane line information of a lane in which a host vehicle is located, host vehicle driving information, and vehicle information of surrounding vehicles.

The driving path determination unit 120 is configured for determining a driving path of the host vehicle based on the lane line information and the host vehicle driving information.

The effective vehicle determination unit 130 is configured for determining an effective vehicle on at least one side of the host vehicle from the surrounding vehicles based on the host vehicle driving path and the vehicle information of the surrounding vehicles.

The congestion state determination unit 140 configured for determining a current congestion state of a corresponding lane based on vehicle information of the effective vehicle on at least one side of the host vehicle and a historical congestion state of the corresponding lane.

In some embodiments, the driving environment information is obtained by processing data collected by a sensing system of the host vehicle. In some embodiments, the lane line information in the driving environment information includes a lane line lateral position, a lane line slope, a lane line curvature, a lane line effective length, and a lane line confidence; the host vehicle driving information comprises a host vehicle steering wheel angle, a host vehicle yaw velocity and a host vehicle speed; the vehicle information of the surrounding vehicle includes a vehicle longitudinal position, a vehicle lateral position, a vehicle longitudinal speed, a vehicle lateral speed, and a vehicle confidence. Accordingly, in some embodiments, the sensing system may include a camera, a steering wheel angle sensor, a yaw velocity sensor, and a vehicle speed sensor. In some embodiments, image data of lane lines on both sides of a vehicle and image data of surrounding vehicles are collected by a camera. An intelligent driving system of the host vehicle can process the image data of lane lines and the image data of surrounding vehicles to obtain lane line information such as a lane line lateral position, a lane line slope, a lane line curvature, a lane line effective length and a lane line confidence, and vehicle information about the surrounding vehicles such as a vehicle confidence. The detection data of the surrounding vehicles are obtained by using the laser radar, and the intelligent driving system can combine the image data of the surrounding vehicles and the detection data of the laser radar to process and obtain the vehicle information of the surrounding vehicles, such as a vehicle longitudinal position, a vehicle lateral position, a vehicle longitudinal speed and a vehicle lateral speed. The host vehicle driving information such as a host vehicle steering wheel angle, a host vehicle yaw velocity and a host vehicle speed is respectively collected by using a steering wheel angle sensor, a yaw velocity sensor and a vehicle speed sensor. The driving environment information is obtained by fusing the lane line information, the vehicle information of the surrounding vehicles, and the host vehicle driving information. Herein, the lane line confidence represents a probability that the image target is a lane line, and the vehicle confidence represents a probability that the image target is a vehicle. As such, the disclosed solution is not dependent on the road infrastructure and the central system, reducing costs. Moreover, it does not need a lot of other vehicle information to be collected and calculated, which improves the real time of the host vehicle congestion sensing, promotes the host vehicle to change lanes in time, and avoids missing the opportunity of lane change. At the same time, the determined current congestion state has a strong correlation with the driving demand of the host vehicle. Namely, the congestion sensing can be performed on any driving section to determine the current congestion state, which solves the problem that congestion detection can only be performed on a specific section in the existing solution due to the limitation of road sections for a set road infrastructure. The disclosed solution has strong universality. In addition, in some embodiments, the camera may be a smart camera. Since the smart camera itself has the capability of an artificial intelligence algorithm, the lane line confidence and the vehicle confidence may both be computed by the smart camera from image data acquired by the smart camera itself.

Figure 3:
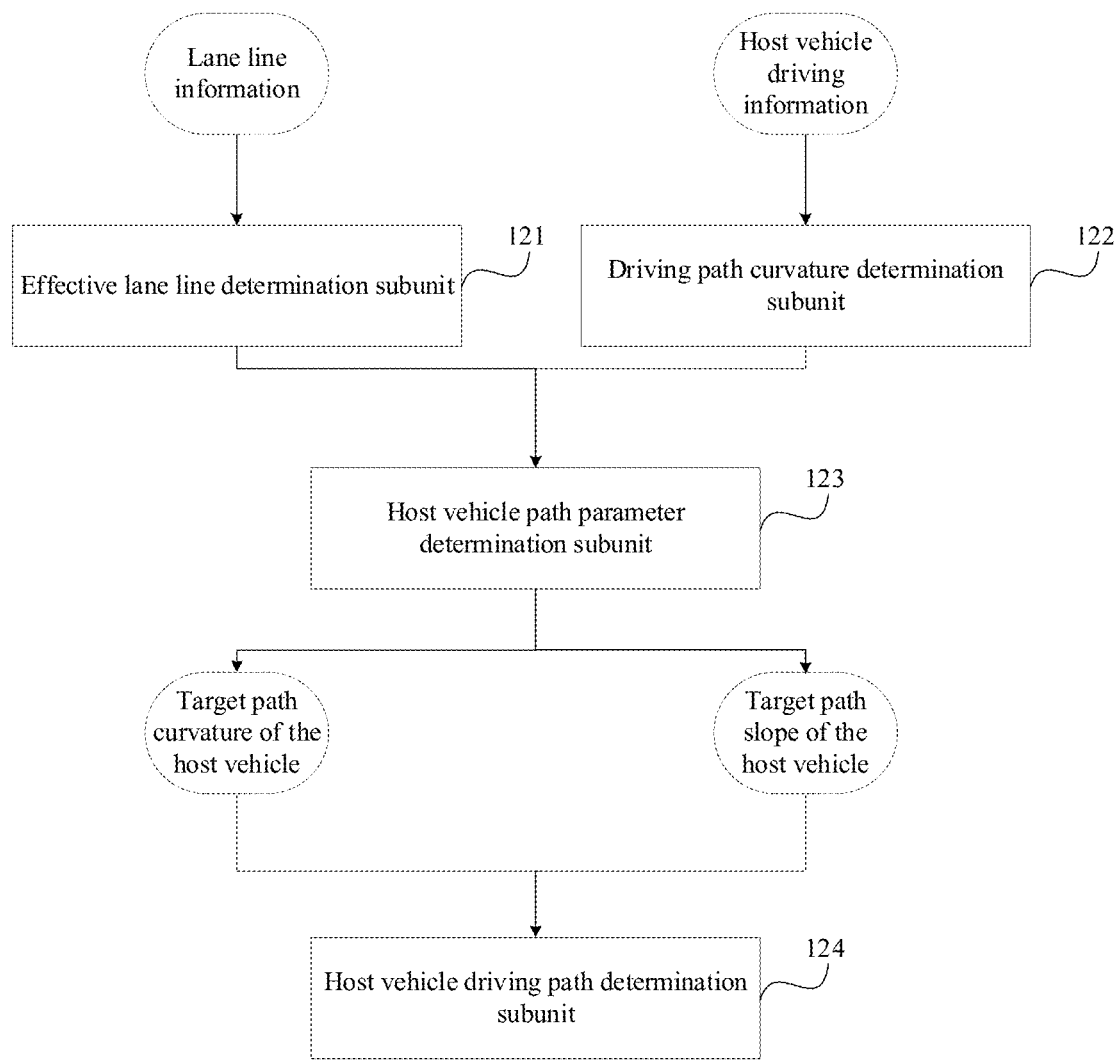
FIG. 3 is a schematic diagram of a functional module of a driving path determination unit according to an embodiment of the present disclosure.

In some embodiments, referring to FIG. 3, the driving path determination unit further includes an effective lane line determination subunit 121, a driving path curvature determination subunit 122, a host vehicle path parameter determination subunit 123, and a host vehicle driving path determination subunit 124. Herein, the effective lane line determination subunit 121 is configured for determining an effective lane line of a lane in which the host vehicle is located based on the lane line information. The driving path curvature determination subunit 122 is configured for determining a driving path curvature of the host vehicle based on the host vehicle driving information in combination with Kalman filtering. The host vehicle path parameter determination subunit 123 is configured for determining a target path curvature of the host vehicle and a target path slope of the host vehicle based on the lane line slope and the lane line curvature of the effective lane line, and the driving path curvature of the host vehicle. The host vehicle driving path determination subunit 124 is configured for determining the host vehicle driving path based on the target path curvature of the host vehicle and the target path slope of the host vehicle. It should be noted that the driving path of the host vehicle refers to a vertical projection on the ground during the driving of the vehicle, including a driving path and a planned path within a preset time in the future.

Basic characteristics of the lane line include a lane line length, a distance between two adjacent lane lines (i.e., a lane width), a lane line slope, a lane line curvature, and the like. Thus, the present disclosure may determine whether the lane line is effective (i.e., whether it is an effective lane line) based on the basic characteristics of the lane line. In some embodiments, the effective lane line determination subunit 121 is specifically used for confirming that the lane line is effective, namely, determining that the lane line is an effective lane line when the effective length of the lane line is greater than a lane line length threshold value, the lane line confidence is higher than a lane line confidence threshold value, the lane line curvature change rate between two frames is lower than a curvature change rate threshold value, the distance from the lane line lateral position to the host vehicle is less than the width of the lane in which the host vehicle is located (indicating that the lane line is the lane line of the lane in which the host vehicle is located, and the lane line lateral position refers to the position of the lane line relative to the host vehicle in the lateral direction), and the lane line slope satisfies the driving along the lane (the set error range in the driving direction of the host vehicle). In this technical solution, the effective lane line determination subunit 121 determines the effective lane line based on the comparison between the lane line information and the corresponding set threshold value and in combination with the lane line confidence, thereby improving the accuracy of lane line effectiveness detection. In addition, when the lane line curvature change rate between two frames is a ratio of a difference in curvature of a lane line obtained from two consecutive frames of lane line images to an interval between the two frames. When the change rate of the lane line curvature between the two frames is too high, i.e., greater than or equal to a threshold value of the change rate of curvature, it indicates that the lane line image data of the two frames has abrupt change, or that the target lane line in the two frames of the lane line image is not a straight line, thereby indicating that the lane line in the lane line image is unlikelihood. It will be appreciated that the lane length threshold, the lane confidence threshold, the curvature rate threshold, and the set error range described above are system configuration parameters that may be set and adjusted based on engineering experience. In addition, in some embodiments, after the effective lane line is determined, an effective identifier for the lane line is set to effective, e.g., the effective identifier is set to 1, in order to distinguish the effective lane line.

In some embodiments, the driving path curvature determination subunit 122 may specifically include a vehicle model and a Kalman filter. Herein, the vehicle model includes a vehicle yaw dynamics model and a tire hysteresis model. The vehicle model acquires a steering wheel angle of the host vehicle and a speed of the host vehicle in the driving information about the host vehicle, and calculates an ideal yaw velocity of the host vehicle according to the steering wheel angle of the host vehicle and the host vehicle speed. Based on the ideal yaw velocity of the host vehicle, the yaw velocity of the host vehicle and the host vehicle speed in the host vehicle driving information, the Kalman filter obtains the stable and low-delay yaw velocity of the host vehicle, and further calculates the driving path curvature of the host vehicle.

In some embodiments, the host vehicle path parameter determination subunit 123 further includes a weight assignment module, a weighted average module, and a tracking filter module. Specifically, the weight assignment module determines an effective lane line according to the effective identifier of the lane line and acquires the driving path curvature of the host vehicle, the lane line slope and the lane line curvature of the effective lane line so as to calculate the lane line curvature change rate of the effective lane line, the driving path curvature change rate of the host vehicle, and the lane line slope change rate of the effective lane line. The curvature with a lower ratio of the change rate has a higher weight coefficient. The weight coefficient of the lane line curvature of the effective lane line and the weight coefficient of the driving path curvature of the host vehicle can be calculated by the following formula:

$$\begin{cases} W_{c\_ln} = \dfrac{dC_v}{dC_{ln} + dC_v} \\ W_{c\_v} = \dfrac{dC_{ln}}{dC_{ln} + dC_v} \end{cases} \text{(for a one-sided effective lane line)}$$

$$\begin{cases} W_{c\_ln\,l} = \dfrac{dC_v + dC_{ln\,r}}{dC_{ln\,l} + dC_{ln\,r} + dC_v} \\ W_{c\_ln\,r} = \dfrac{dC_v + dC_{ln\,l}}{dC_{ln\,l} + dC_{ln\,r} + dC_v} \\ W_{c\_v} = \dfrac{dC_{ln\,l} + dC_{ln\,r}}{dC_{ln\,l} + dC_{ln\,r} + dC_v} \end{cases} \text{(for both-sided effective lane lines)}$$

Where $W_{c\_ln}$ is a weight coefficient of the lane line curvature of the effective lane line; $W_{c\_v}$ is a weight coefficient of the driving path curvature of the host vehicle; $dC_{ln}$ is a lane line curvature change rate of the effective lane line; $dC_v$ is a driving path curvature change rate of the host vehicle; $W_{c\_ln\,l}$ is a weight coefficient of the lane line curvature of the left effective lane line; $W_{c\_ln\,r}$ is a weight coefficient of the lane line curvature of the right effective lane line; $dC_{ln\,l}$ is a lane line curvature change rate of the left effective lane line; and $dC_{ln\,r}$ is a lane line curvature change rate of the right effective lane line.

In addition, the slope with a lower change rate has a higher weight coefficient. The weight coefficient of the lane line slope of the effective lane line can be obtained by the following formula:

$$\begin{cases} W_{kpl} = \dfrac{dk_{pr}}{dk_{pr} + dk_{pl}} \\ W_{kpr} = \dfrac{dk_{pl}}{dk_{pr} + dk_{pl}} \end{cases};$$

where $W_{kpl}$ is a weight coefficient of the lane line slope of the left effective lane line; $W_{kpr}$ is a weight coefficient of the lane line slope of the right effective lane line; $dk_{pl}$ is a change rate of the lane line slope of the left effective lane line; and $dk_{pr}$ is a change rate of the lane line slope of the right effective lane line.

Then, the weighted average module performs a weighted average calculation based on the lane line slope, the lane line curvature, the driving path curvature of the host vehicle, the weight coefficient of the lane line curvature, the weight coefficient of the driving path curvature of the host vehicle, and the weight coefficient of the lane line slope of the effective lane line to obtain the weighted path curvature of the host vehicle and the weighted path slope of the host vehicle. Finally, the tracking filter module performs mean filtering on the weighted path curvature of the host vehicle and the weighted path slope of the host vehicle to obtain a relatively stable target path curvature of the host vehicle and a target path slope of the host vehicle. In this technical solution, the weighted average calculation and the mean filtering are conventional algorithms, and therefore the description thereof will not be repeated here. In addition, the host vehicle driving path determination subunit 124 calculates the host vehicle driving path based on the target path curvature of the host vehicle and the slope target path of the host vehicle, which is also a conventional technique and will not be described in detail herein.

Note that when an effective lane line of the lane in which the host vehicle is located fails based on the lane line information, i.e., the lane line of the lane in which the host vehicle is located is unlikelihood, including the left-side lane line and/or the right-side lane line. The weight coefficient of the lane line curvature and the weight coefficient of the lane line slope corresponding to the lane line are 0. At this time, the host vehicle driving path can still be determined based on the driving path curvature of the host vehicle.

Figure 4:
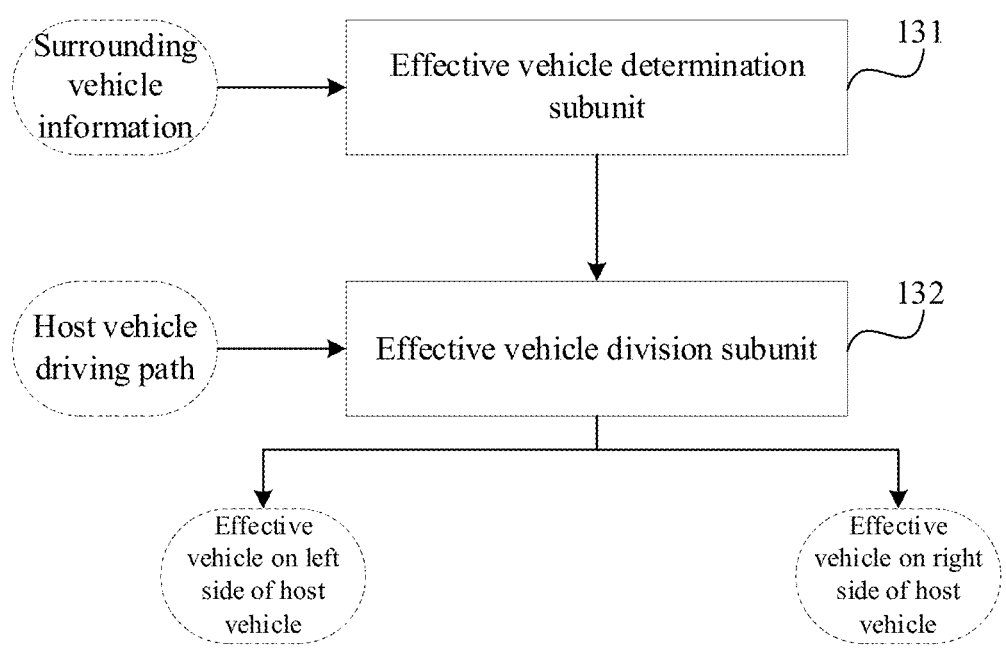
FIG. 4 is a schematic diagram of a functional module of an effective vehicle determination unit provided in an embodiment of the present disclosure.

In some embodiments, the effective vehicle on the left side of the host vehicle and the effective vehicle on the right side of the host vehicle may be divided according to the driving path of the host vehicle, so that the current congestion state of the corresponding lane of the effective vehicle on the left side of the host vehicle and/or the effective vehicle on the right side of the host vehicle may be determined. In some embodiments, referring to FIG. 4, the effective vehicle determination unit further includes an effective vehicle determination subunit 131 and an effective vehicle division subunit 132. The effective vehicle determination subunit 131 is configured for determining an effective vehicle based on the vehicle information of surrounding vehicles, and the effective vehicle division subunit 132 is configured for determining an effective vehicle on at least one side of the host vehicle based on the host vehicle driving path and the vehicle information of the effective vehicle. It should be noted that the effective vehicle of the present disclosure is a surrounding vehicle that can be used for the technical solution of the present disclosure to effectively detect the current congestion state of the left-side lane and/or the right-side lane, and does not specifically refer to all the surrounding vehicles collected and identified by the sensing system.

In some embodiments, the effective vehicle determination subunit 131 is specifically configured for determining that one or more vehicles are effective vehicles when the vehicle longitudinal position of the one or more vehicles corresponding to the vehicle information of the surrounding vehicles is within a first preset range, the vehicle lateral position thereof is within a second preset range, the vehicle longitudinal speed thereof is greater than a first speed threshold, and the vehicle confidence thereof is greater than a first confidence threshold. The vehicle longitudinal position is the position of the surrounding vehicle relative to the host vehicle in the longitudinal direction (i.e., the front-rear direction). At this time, it should be noted that if the left and/or right-side vehicle and the host vehicle overlap in the lateral direction, the vehicle longitudinal position of the left and/or right-side vehicle is determined to be 0, and the first preset range includes 0. If the head of the left-side vehicle is flush with a part of the host vehicle, the vehicle longitudinal position of the left-side vehicle is determined to be 0, which is within a first preset range. Further, the vehicle longitudinal position of the front vehicle may be a longitudinal position of the rear of the front vehicle with respect to the head of the host vehicle, and the vehicle longitudinal position of the rear vehicle may be a longitudinal position of the head of the rear vehicle with respect to the rear of the host vehicle. The vehicle lateral position is a position of the surrounding vehicle with respect to the host vehicle in the lateral direction (i.e., the left-right direction), such as a lateral position of the right side of the left-side vehicle with respect to the left side of the host vehicle, or a lateral position of the left side of the right-side vehicle with respect to the right side of the host vehicle. In addition, the vehicle longitudinal position and the vehicle lateral position may also be referenced to the planar center point of the vehicle. The vehicle longitudinal speed is a running speed of the surrounding vehicle. The vehicle confidence is used to characterize the degree of certainty or probability that the target vehicle in the image is a vehicle. The higher the vehicle confidence, the greater the probability that the target vehicle in the image is a vehicle. In the disclosed embodiment, the first preset range, the second preset range, the first speed threshold value and the first confidence threshold value are system configuration parameters. Among them, the first preset range can be determined by the sensing capability (such as the sensing distance) of the sensing system. The second preset range can be determined by the lane width, for example, the maximum value of the second preset range should be less than one lane width, so as to ensure that the surrounding vehicle is a vehicle on an adjacent lane of the host vehicle. The first speed threshold value and the first confidence threshold value can be set and adjusted according to engineering experience.

In some embodiments, the effective vehicle division subunit 132 is specifically used to determine a vehicle lateral position of the corresponding vehicle within the preview time based on the vehicle lateral speed in the vehicle information of the effective vehicle when the host vehicle travels straight along a straight lane in which the host vehicle is located or the host vehicle changes directions and the effective lane line is determined to be failed; determining a vehicle of which the vehicle lateral position at the current moment and the vehicle lateral position in the preview time are both within a first distance threshold on the left side of the driving path of the host vehicle as an effective vehicle on the left side of the host vehicle; and determining a vehicle of which the vehicle lateral position at the current time and the vehicle lateral position in the preview time are both within a second distance threshold on the right side of the driving path of the host vehicle as an effective vehicle on the right side of the host vehicle. Herein, the direction change of the host vehicle may include a turn of the host vehicle or a lane change of the host vehicle. The failure of determining an effective lane line means that the lane line of the lane in which the host vehicle is located obtained when the host vehicle changes directions is unlikelihood. That is, the lane line of the lane in which the host vehicle is located cannot be obtained when the host vehicle changes directions, the lane line including the left lane line and the right lane line. When the unmanned vehicle performs path planning, a driving path within a preset time in the future is planned. The preview time in the disclosed embodiment should be less than or equal to the preset time in the future. Based on the vehicle lateral speed in the vehicle information of the effective vehicle, the technical solution can predict the vehicle lateral position of the effective vehicle at each moment in the preview time, so as to judge whether the effective vehicle is always located on the lane adjacent to the host vehicle based on the vehicle lateral position at the current moment and the vehicle lateral position in the preview time with the driving path of the host vehicle in the preview time as a reference, and divide the effective vehicle on the left side of the host vehicle and the effective vehicle on the right side of the host vehicle while ensuring that the effective vehicle is always located on the lane adjacent to the host vehicle. Here, the first distance threshold and the second distance threshold are system configuration parameters and are related to a lane width. For example, the first distance threshold and the second distance threshold are both less than one lane width.

Further, considering that the driving direction of the vehicle is along the extending direction of the lane when the vehicle travels straight on a straight lane, the effective vehicle on the left side of the vehicle is the effective vehicle on the left side of the lane, and the effective vehicle on the right side of the vehicle is the effective vehicle on the right side of the lane. Now, the effective vehicle on the left side of the host vehicle and the effective vehicle on the right side of the host vehicle can be accurately divided according to the driving path of the host vehicle. However, when any of the following situations occurs, the division of the effective vehicle on the left side of the host vehicle and the effective vehicle on the right side of the host vehicle according to the driving path of the host vehicle may cause the loss of the effective vehicle. Firstly, when the vehicle turns, there is a driving heading angle (the driving heading angle refers to an included angle between a driving direction and a tangent line of a circumference of a point where the host vehicle is located). At this time, the effective vehicle on the left side of the host vehicle and the effective vehicle on the right side of the host vehicle which are divided according to the driving path of the host vehicle may have an error. For example, when the host vehicle turns right, an effective vehicle in a front position of a lane on the left side of the host vehicle may be located on the right side of a straight line where the driving direction of the host vehicle is located. That is to say, the vehicle lateral position of the effective vehicle at the moment is located on the right side of the driving path of the host vehicle, resulting in that one or more effective vehicle may be not always located on the left side of the driving path of the host vehicle and abandoned. Thus, there is a problem that some effective vehicles are omitted. Secondly, when the vehicle changes lanes, the re-planned driving path of the host vehicle may deviate from the lane where it is located, i.e., there is an angle between the re-planned driving path of the host vehicle and the lane where it is located. In the process of vehicle changing lanes, some effective vehicles divided based on the host vehicle driving path before the vehicle changing lanes may be located on the re-planned driving path of the host vehicle, resulting in the loss of the part of the effective vehicles. Therefore, the division result of the effective vehicle jumps when the vehicle turns or when the vehicle changes lanes, resulting in an erroneous judgment of the congestion state. In particular, in the course of vehicle lane change, since the division result of the effective vehicle changes, the result of judgment of the current congestion state of the target lane (lane to be changed) changes. For example, the target lane is determined to be non-congested or slightly congested, and the vehicle may change lanes before the vehicle lane change. However, in the process of vehicle lane change, the target lane may be determined to be moderately congested and non-changeable lane, resulting in failure of the vehicle lane change. Therefore, the disclosed embodiment may further correct the effective vehicle on the left side of the host vehicle and the effective vehicle on the right side of the host vehicle divided in the above-described embodiment based on the lane line of the lane in which the host vehicle is located.

In some embodiments, the effective vehicle division subunit 132 may be further configured for determining a vehicle lateral position of the corresponding vehicle within the preview time based on the vehicle lateral speed in the vehicle information of the effective vehicle when the host vehicle changes directions and the effective lane line is determined; determining a vehicle of which the vehicle lateral position at the current moment and the vehicle lateral position in the preview time are both located within a third distance threshold on the left side of the effective lane line on the left side of the host vehicle as an effective vehicle on the left side of the host vehicle; and determining a vehicle of which the lateral position at the current time and the vehicle lateral position in the preview time are both within a fourth distance threshold on the right side of the effective lane line on the right side of the host vehicle as an effective vehicle on the right side of the host vehicle. Herein, the direction change of the host vehicle may include a turn of the host vehicle or a lane change of the host vehicle. The determining an effective lane line means that the lane line of the lane in which the host vehicle is located acquired when the host vehicle changes directions is credible, that is, that the lane line of the lane in which the host vehicle is located can be acquired when the host vehicle changes directions, the lane line including a left lane line and a right lane line. Thus, in conjunction with the above-described embodiment, when the host vehicle travels straight on a straight lane, the effective vehicle on the left side of the host vehicle and the effective vehicle on the right side of the host vehicle are divided based on the driving path of the host vehicle. In some cases (such as road congestion), when the host vehicle changes directions, since the lane line of the lane in which the host vehicle is located cannot be obtained due to the blocking of the surrounding vehicles, the effective vehicle on the left side of the host vehicle and the effective vehicle on the right side of the host vehicle are still divided based on the driving path of the host vehicle at this time. When the host vehicle changes directions and the lane line of the lane in which the host vehicle is located can be acquired, the effective vehicle on the left side of the host vehicle and the effective vehicle on the right side of the host vehicle are divided on the basis of the lane line. Thus, the effective vehicle on the left side of the host vehicle and the effective vehicle on the right side of the host vehicle divided at any moment from the host vehicle starting changing directions to the change direction being completed on the basis of the lane line are the same as the effective vehicle on the left side of the host vehicle and the effective vehicle on the right side of the host vehicle which are divided on the basis of the driving path of the host vehicle before the moment when the host vehicle starts changing directions, thereby avoiding the division result of the effective vehicle from jumping when the host vehicle changes directions, which ensures that the congestion state of the target lane determined in the course of the host vehicle changing direction remains unchanged, plays a buffering role in determining the congestion state, and making the host vehicle change direction smoothly. Herein, the third distance threshold and the fourth distance threshold are system configuration parameters and are related to a lane width. For example, the third distance threshold and the fourth distance threshold are both less than one lane width.

Figure 5:
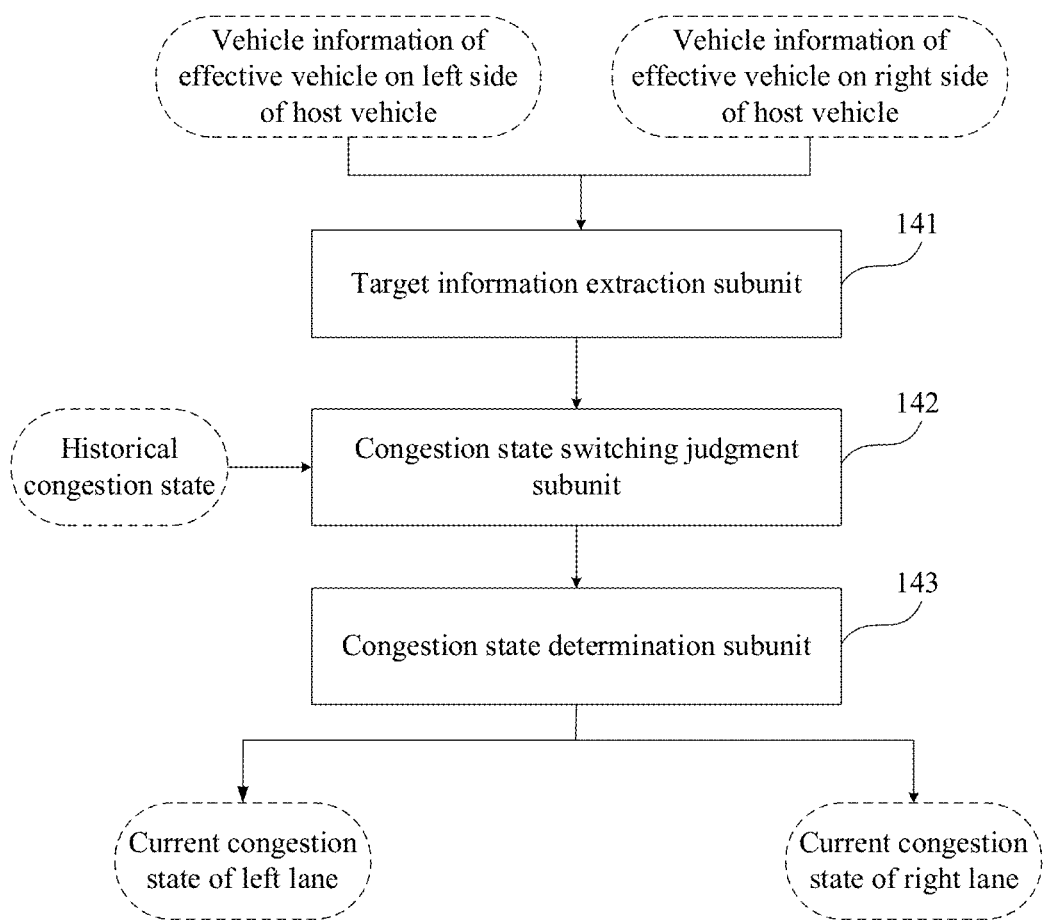
FIG. 5 is a schematic diagram of a functional module of a congestion state determination unit provided in an embodiment of the present disclosure.
Figure 6:
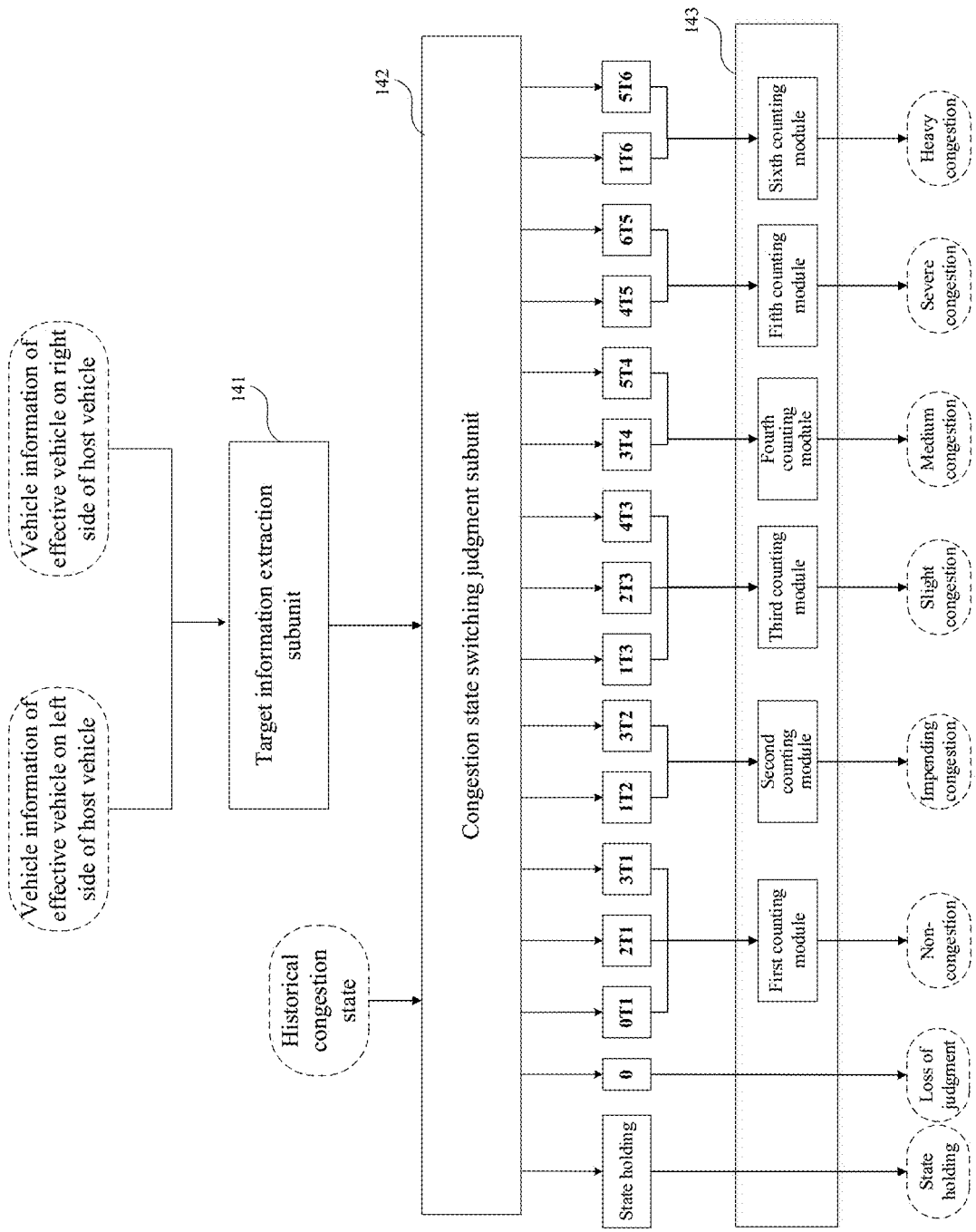
FIG. 6 is a detailed schematic diagram of a functional module of a congestion state determination unit provided in an embodiment of the present disclosure.

In some embodiments, in conjunction with FIGS. 5 and 6, the congestion state determination unit further includes a target information extraction subunit 141, a congestion state switching judgment subunit 142, and a congestion state determination subunit 143. The target information extraction subunit 141 is configured for determining the number, an average vehicle speed, and an average vehicle distance of the effective vehicles on a corresponding lane based on the vehicle information of effective vehicles on at least one side of the host vehicle. The congestion state switching judgment subunit 142 is configured for determining a congestion state switching result based on the number, the average vehicle speed and the average vehicle distance of the effective vehicles, wherein the congestion state switching result represents a change situation of the congestion state; the congestion state determination subunit 143 is configured for determining a current congestion state of the corresponding lane based on the congestion state switching result. In addition, in FIG. 6, "0" represents a loss of judgment, "1" represents a non-congestion, "2" represents an impending congestion, "3" represents a slight congestion, "4" represents a medium congestion, "5" represents a heavy congestion, "6" represents a severe congestion, and "T" represents a switching, wherein the degree of congestion is gradually increased from "1" to "6".

In some embodiments, the target information extraction subunit 141 may determine the effective vehicle on the left side of the host vehicle and/or the effective vehicle on the right side of the host vehicle based on the division results of the effective vehicles in the above-described embodiments, thereby determining the number of effective vehicles on the left lane and/or the right lane. Then, the target information extraction subunit 141 calculates an average vehicle speed of the effective vehicles on the left and/or right side lanes based on the vehicle longitudinal speed of each effective vehicle on the left and/or right side lanes. Finally, the target information extraction subunit 141 calculates the average vehicle distance of the effective vehicles on the left and/or right lanes based on the vehicle longitudinal position of each effective vehicle on the left and/or right lanes.

It will be appreciated that in order to achieve efficient and flexible lane change of a vehicle, the vehicle information for a vehicle on a lane is acquired whenever there is a lane on either side of the vehicle. In some embodiments, when the vehicle is driving in the inner lane, the vehicle information of the vehicles on the two adjacent lanes is acquired in real time, thereby determining an effective vehicle on the left side of the host vehicle and an effective vehicle on the right side of the host vehicle. At this time, the congestion state determination unit determines a current congestion state of a left adjacent lane based on the vehicle information of the effective vehicle on the left side of the host vehicle and the historical congestion state of the left adjacent lane, and determines a current congestion state of a right adjacent lane based on the vehicle information of the effective vehicle on the right side of the host vehicle and the historical congestion state of the right adjacent lane. In some embodiments, when the vehicle is driving in the outermost lane, the vehicle information of the vehicle on the inner adjacent lane is acquired in real time. For example, when the vehicle is driving in the rightmost lane, only the vehicle information of the vehicle on the left-side adjacent lane is acquired to determine the effective vehicle on the left side of the host vehicle, and the congestion state determination unit determines the current congestion state of the left-side adjacent lane based on the vehicle information of the effective vehicle on the left side of the host vehicle and the historical congestion state of the left-side adjacent lane.

In some embodiments, the congestion state includes a loss of judgment, a non-congestion, an impending congestion, a slight congestion, a medium congestion, a heavy congestion and a severe congestion. Within each judgment period, the congestion state switching result comprises state holding, a loss of judgment, switching from the loss of judgment to the non-congestion, switching from the congestion to the non-congestion, switching from the slight congestion to the non-congestion, switching from the non-congestion to the impending congestion, switching from the slight congestion to the impending congestion, switching from the non-congestion to the slight congestion, switching from the impending congestion to the slight congestion, switching from the medium congestion to the slight congestion, switching from the slight congestion to the medium congestion, switching from the heavy congestion to the medium congestion, switching from the medium congestion to the heavy congestion, switching from the heavy congestion to the severe congestion, switching from the non-congestion to the heavy congestion, and switching from the heavy congestion to the severe congestion.

In the embodiment of the present disclosure, the above-mentioned judgment period is a judgment period of a congestion state switching result, and the judgment period can be set and adjusted according to engineering experience. In each judgment period, only one congestion state switching result can exist. In some embodiments, each congestion state switching result may be determined sequentially in a pre-set order in each judgment period. When one congestion state switching result is determined, other congestion state switching results are not necessarily determined.

Specifically, the congestion state switching judgment sub-unit 142 is configured for:

determining that the congestion state switching result is a loss of judgment after determining that the number of effective vehicles is less than 1;

determining that the congestion state switching result is switching from the loss of judgment to the non-congestion after judging that the historical congestion state is the loss of judgment and the number of effective vehicles is greater than n1;

determining that the congestion state switching result is switching from the impending congestion to the non-congestion after judging that the historical congestion state is the impending congestion, the number of the effective vehicles is less than n2, and the average vehicle speed is greater than that of the host vehicle speed by v1 or above;

determining that the congestion state switching result is switching from the slight congestion to the non-congestion after judging that the historical congestion state is the slight congestion, the number of the effective vehicles is less than n3, the average vehicle distance is greater than L1, or the average vehicle speed is greater than v2;

determining that the congestion state switching result is switching from the non-congestion to the impending congestion after judging that the historical congestion state is the non-congestion, the number of the effective vehicles is greater than n4, the relative longitudinal distance of the nearest effective vehicle is greater than L2, and the average vehicle speed is greater than that of the host vehicle height by v3 or above;

determining that the congestion state switching result is switching from the slight congestion to the impending congestion after judging that the historical congestion state is the slight congestion and the relative longitudinal distance of the nearest effective vehicle is greater than L3;

determining that the congestion state switching result is switching from the non-congestion to the slight congestion after judging that the historical congestion state is the non-congestion, the number of the effective vehicles is greater than n5, the average vehicle distance is less than L4, and the relative longitudinal distance of the nearest effective vehicle is less than L5;

determining that the congestion state switching result is switching from the impending congestion to the slight congestion after judging that the historical congestion state is the impending congestion and the relative longitudinal distance of the nearest effective vehicle is less than L6;

determining that the congestion state switching result is switching from the medium congestion to the slight congestion after judging that the historical congestion state is medium congestion, and the number of the effective vehicles is less than n6, or the average vehicle distance is greater than L7, or the average vehicle speed is greater than that of the host vehicle by v4 or above;

determining that the congestion state switching result is switching from the slight congestion to the medium congestion after judging that the historical congestion state is a slight congestion, the number of the effective vehicles is greater than n7, the average vehicle distance is less than L8, and the average vehicle speed is less than v5;

determining that the congestion state switching result is switching from the heavy congestion to the medium congestion after judging that the historical congestion state is the heavy congestion, the average vehicle distance is greater than L9, the number of the effective vehicles is less than n8, or the average vehicle speed is greater than that of the host vehicle by v6 or above;

determining that the congestion state switching result is switching from the medium congestion to the heavy congestion after judging that the historical congestion state is the medium congestion, the number of the effective vehicles is greater than n9, the average vehicle distance is less than L10, and the average vehicle speed is less than v7;

determining that the congestion state switching result is switching from the heavy congestion to the severe congestion after judging that the historical congestion state is the severe congestion, and the number of the effective vehicles is less than n10, or the average vehicle speed is greater than v8, or the average vehicle speed is greater than that of the host vehicle height by v9 or above;

determining that the congestion state switching result is switching from the non-congestion to the heavy congestion after judging that the historical congestion state is the non-congestion, the number of the effective vehicles is greater than n11, and the average vehicle speed is less than v10; and determining that the congestion state switching result is switching from the severe congestion to the heavy congestion after judging that the historical congestion state is the heavy congestion and the average vehicle speed is less than v11;

when none of the above conditions is satisfied, it is determined to the state holding (the congestion state switching result remains unchanged);

wherein n1-n11, L1-L10 and v1-v11 are system configuration parameters, and can be calibrated according to an actual congestion state.

In some embodiments, the congestion state determination subunit 143 is specifically configured for:

determining that the current congestion state is a loss of judgment after determining that the congestion state switching result is the loss of judgment;

adding one to a first counting module after judging that the current congestion state is switching from the loss of judgment to the non-congestion, switching from the impending congestion to the non-congestion, or switching from the slight congestion to the non-congestion; determining that the current congestion state is the non-congestion when a counting result continuously counted by the first counting module is greater than a first counting threshold value;

adding one to a second counting module one after judging that the congestion state switching result is switching from the non-congestion to the impending congestion or switching from the slight congestion to the impending congestion; determining that the current congestion state is the impending congestion when a counting result continuously counted by the second counting module is greater than a second counting threshold value;

adding one to a third counting module after judging that the congestion state switching result is switching from the non-congestion to the slight congestion, switching from the impending congestion to the slight congestion or switching from the medium congestion to the slight congestion; determining that the current congestion state is the slight congestion when a counting result continuously counted by the third counting module is greater than a third counting threshold value;

adding one to a fourth counting module after judging that the congestion state switching result is switching from the slight congestion to the medium congestion or heavy congestion switches to medium congestion; determining that the current congestion state is switching from the heavy congestion to the medium congestion when a counting result continuously counted by the fourth counting module is greater than a fourth counting threshold value;

adding one to a fifth counting module after judging that the congestion state switching result is switching from the medium congestion to the severe congestion or switching from the heavy congestion to the severe congestion; determining that the current congestion state is the severe congestion when a counting result continuously counted by the fifth counting module is greater than a fifth counting threshold value;

adding one to a sixth counting module after judging that the congestion state switching result is switching from the non-congestion to the heavy congestion or switching from the severe congestion to the heavy congestion; determining that the current congestion state is the severe congestion when a counting result continuously counted by the sixth counting module is greater than a sixth counting threshold value;

when none of the above conditions is satisfied, it is determined to the state holding (the current congestion state remains unchanged);

wherein, in the case of non-state holding, only one counting module operates in each judgment period; and the counts of the other counting modules are reset when one counting module of the first counting module, the second counting module, the third counting module, the fourth counting module, the fifth counting module and the sixth counting module starts to count.

In the embodiment of the present disclosure, the first counting threshold value, the second counting threshold value, the third counting threshold value, the fourth counting threshold value, the fifth counting threshold value and the sixth counting threshold value may be different from each other, may be partially the same, or may all be the same. They can be specifically debugged according to simulation tests, as long as the calculated current congestion state matches the actual current congestion state. It needs to be stated that in the process of continuously counting by any counting module (except for a counting result from the continuous counting being greater than a corresponding counting threshold value), the historical congestion state remains unchanged, and the correspondingly determined current congestion state is state holding. Namely, the current congestion state is the same as the historical congestion state. In addition, "when none of the above conditions is satisfied, it is determined that the state remains", which may include: after determining that the congestion state switching result is the state holding, determining that the current congestion state is the state holding; alternatively, determining that the current congestion state is the state holding after any one of the above-mentioned judgment conditions for the current congestion state is not satisfied within a preset time. Considering that a counting result continuously counted by a counting module is reset when it is not greater than a corresponding counting threshold value due to a change of a congestion state switching result, another counting module starts to count again. Therefore, in order to prevent the judgment process of the current congestion state from being performed for a long time, a preset time is set, and it is determined to be the state holding when none of the above conditions is satisfied within the preset time.

In some embodiments, $n1<n2=n4 \leq n3=n5<n6=n7 \leq n8<n9=n10<n11$, $v1 \leq v10 \leq v11<v9 \leq v8<v3 \leq v4<v7<v6 \leq v5<v2$, $L1 \geq L4 \geq L7>L2 \geq L3 \geq L9>L10>L6>L8>L5$. Thus, when the size relationship of the configuration parameters is satisfied, the applicability of the congestion state switching determination can be improved and the accuracy of the congestion state determination can be ensured by calibrating the configuration parameters. By way of example, assuming that the historical congestion state is an impending congestion and the current actual congestion state is a slight congestion, based on the acquired driving environment information, it can be determined that the above-mentioned congestion state switching judgment condition of "the historical congestion state is the impending congestion and the relative longitudinal distance of the nearest effective vehicle is less than L6" is satisfied, and the congestion state switching result is determined to switch from the impending congestion to the slight congestion, thereby determining that the current congestion state is a slight congestion. Thereafter, the historical congestion state is updated to be the slight congestion. Since L1>L6 and L3>L6 and the actual effective vehicle relative longitudinal distance is less than L6, the congestion state switching judgment conditions of "judging that the historical congestion state is the slight congestion, the number of the effective vehicles is less than n3, the average vehicle distance is greater than L1, or the average vehicle speed is greater than v2" and "judging that the historical congestion state is the slight congestion and the relative longitudinal distance of the nearest effective vehicle is greater than L3" are not satisfied. In addition, as can be known from "determining that the congestion state switching result is switching from the medium congestion to the slight congestion after judging that the historical congestion state is medium congestion, and the number of the effective vehicles is less than n6, or the average vehicle distance is greater than L7, or the average vehicle speed is greater than that of the host vehicle by v4 or above", when the actual congestion state is the slight congestion, the number of effective vehicles is less than n6, and n6=n7, the congestion state switching judgment condition of "judging that the historical congestion state is a slight congestion, the number of the effective vehicles is greater than n7, the average vehicle distance is less than L8, and the average vehicle speed is less than v5" is not satisfied. Therefore, after it is judged that the current congestion state is a slight congestion, all the congestion state switching judgment conditions are not satisfied, and the state is maintained, that is, it is determined that the current congestion state is a slight congestion and complies with the current actual congestion state.

In some embodiments, and with continued reference to FIG. 2, the device for sensing the traffic congestion may further include a cache unit 150 for storing the above-determined current congestion state as a historical congestion state for a next judgment period. Thus, the real-time updating of the historical congestion state is implemented to ensure the accuracy of the judgment of the congestion state switching result, and then the current congestion state is accurately obtained.

In some embodiments, the initial historical congestion state is a loss of judgment. At this time, when the traffic congestion sensing function is activated, the default historical congestion state is a loss of judgment. In conjunction with the method for determining a congestion state switching result in the above-mentioned solution, in the first judgment period, the historical congestion state is a loss of judgment. Generally speaking, when an unmanned vehicle starts up, a traffic congestion sensing function will be started. At this time, a congestion state will generally not exist in a lane, and there are fewer vehicles on adjacent lanes, satisfying the judgment condition that "the congestion state switching result is switching from the loss of judgment to the non-congestion", namely, "judging that the historical congestion state is the loss of judgment and the number of effective vehicles is greater than n1". At this time, according to the above-mentioned judgment method for the current congestion state, after a plurality of successive judgment periods are passed, the condition that "one is added to a first counting module after judging that the current congestion state is switching from the loss of judgment to the non-congestion, switching from the impending congestion to the non-congestion, or switching from the slight congestion to the non-congestion; when a counting result continuously counted by the first counting module is greater than a first counting threshold value" is satisfied so as to determine that the current congestion state is the non-congestion, i.e., the initial historical congestion state can be updated so as to make the subsequent congestion state switching result reliable and effective. It should be noted that the initial historical congestion state cannot be judged to be only an alternative embodiment of the present disclosure. In other embodiments, the initial historical congestion state may also be any congestion state set in the present disclosure, such as a non-congestion, i.e., an impending congestion and a slight congestion.

Figure 7:
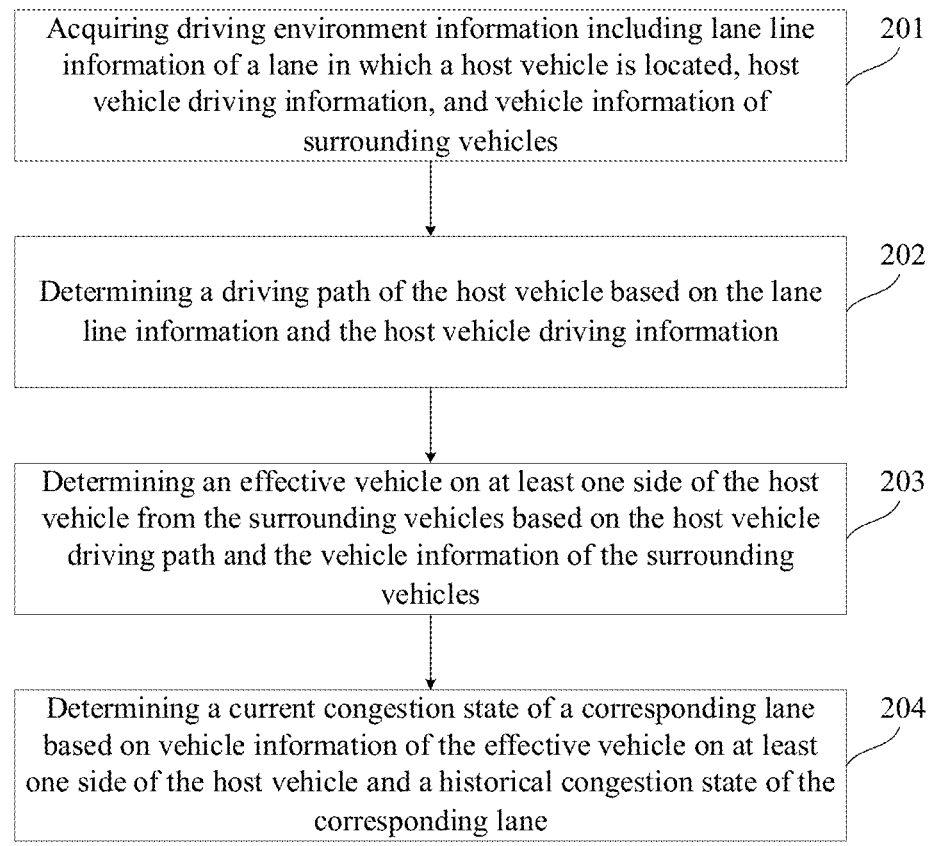
FIG. 7 is a flowchart of a method for sensing a traffic congestion provided in an embodiment of the present disclosure.

Another aspect of embodiments of the present disclosure provides a method for sensing a traffic congestion. FIG. 7 shows a flowchart of a method for sensing a traffic congestion. In some embodiments, the method may be performed by the device for sensing a traffic congestion described above. As shown in FIG. 7, the method includes:

step 201, acquiring driving environment information including lane line information of a lane in which a host vehicle is located, host vehicle driving information, and vehicle information of surrounding vehicles.

In some embodiments, the driving environment information is obtained by processing data collected by a sensing system of the host vehicle. In some embodiments, the lane line information in the driving environment information includes a lane line lateral position, a lane line slope, a lane line curvature, a lane line effective length, and a lane line confidence; the host vehicle driving information comprises a host vehicle steering wheel angle, a host vehicle yaw velocity and a host vehicle speed; the vehicle information of the surrounding vehicle includes a vehicle longitudinal position, a vehicle lateral position, a vehicle longitudinal speed, a vehicle lateral speed, and a vehicle confidence. Accordingly, in some embodiments, the sensing system may include a camera, a steering wheel angle sensor, a yaw velocity sensor, and a vehicle speed sensor. Step 201 may be performed by the environment information acquisition unit in the embodiment of the present disclosure, which will not be described in detail in the embodiment of the method of the present disclosure.

Step 202, determining a driving path of the host vehicle based on the lane line information and the host vehicle driving information.

In some embodiments, the determining a driving path of the host vehicle based on the lane line information and the host vehicle driving information may specifically include the following steps 2011 to 2014.

Step 2011, determining an effective lane line of a lane in which the host vehicle is located based on the lane line information.

Step 2012, determining a driving path curvature of the host vehicle based on the host vehicle driving information in combination with Kalman filtering.

Step 2013, determining a target path curvature of the host vehicle and a target path slope of the host vehicle based on the lane line slope and the lane line curvature of the effective lane line, and the driving path curvature of the host vehicle.

Step 2014, determining the host vehicle driving path based on the target path curvature of the host vehicle and the target path slope of the host vehicle.

Step 202 may be performed by the driving path determination unit in the embodiment of the present disclosure. Specifically, Step 2011 may be performed by the effective lane line determination subunit. Step 2012 may be performed by the driving path curvature determination subunit. Step 2013 may be performed by the host vehicle path parameter determination subunit.

Step 2014 may be performed by the host vehicle driving path determination subunit. For the contents not described in detail in step 202, reference may be made to the description of the driving path determination unit and each subunit thereof in the above-mentioned embodiment, and the description thereof will not be repeated here.

Step 203, determining an effective vehicle on at least one side of the host vehicle from the surrounding vehicles based on the host vehicle driving path and the vehicle information of the surrounding vehicles.

In some embodiments, the effective vehicle on the left side of the host vehicle and the effective vehicle on the right side of the host vehicle may be divided according to the driving path of the host vehicle, so that the current congestion state of the corresponding lane of the effective vehicle on the left side of the host vehicle and/or the effective vehicle on the right side of the host vehicle may be determined.

In some embodiments, the determining an effective vehicle on at least one side of the host vehicle from the surrounding vehicles based on the host vehicle driving path and the vehicle information of the surrounding vehicles may specifically include the following steps 2031 to 2032.

Step 2031, determining an effective vehicle from the surrounding vehicles based on the vehicle information of the surrounding vehicles.

In some embodiments, the one or more vehicles are determined to be effective vehicles when the vehicle longitudinal position of the one or more vehicles corresponding to the vehicle information of the surrounding vehicles is within a first preset range, the vehicle lateral position thereof is within a second preset range, the vehicle longitudinal speed thereof is greater than a first speed threshold, and the vehicle confidence thereof is greater than a first confidence threshold.

Step 2032, determining an effective vehicle on at least one side of the host vehicle based on the host vehicle driving path and the vehicle information of the effective vehicle.

In some embodiments, when the host vehicle travels straight along a straight lane in which the host vehicle is located or the host vehicle changes directions and the effective lane line is determined to be failed, an effective vehicle is determined based on at least one side of the host vehicle based on the host vehicle driving path and the vehicle information of the effective vehicle. Herein, the direction change of the host vehicle may include a turn of the host vehicle or a lane change of the host vehicle. The failure of determining an effective lane line means that the lane line of the lane in which the host vehicle is located obtained when the host vehicle changes directions is unlikelihood. That is, the lane line of the lane in which the host vehicle is located cannot be obtained when the host vehicle changes directions, the lane line including the left lane line and the right lane line. Specifically, a vehicle lateral position of the corresponding vehicle within the preview time is determined based on the vehicle lateral speed in the vehicle information of the effective vehicle. A vehicle of which the vehicle lateral position at the current moment and the vehicle lateral position in the preview time are both within a first distance threshold on the left side of the driving path of the host vehicle is determined as an effective vehicle on the left side of the host vehicle. A vehicle of which the vehicle lateral position at the current time and the vehicle lateral position in the preview time are both within a second distance threshold on the right side of the driving path of the host vehicle is determined as an effective vehicle on the right side of the host vehicle.

In addition, the disclosed embodiment may further correct the effective vehicle on the left side of the host vehicle and the effective vehicle on the right side of the host vehicle divided in the above-described embodiment based on the lane line of the lane in which the host vehicle is located.

In some embodiments, a vehicle lateral position of the corresponding vehicle within the preview time based on the vehicle lateral speed in the vehicle information of the effective vehicle is determined when the host vehicle changes directions and the effective lane line is determined. A vehicle of which the vehicle lateral position at the current moment and the vehicle lateral position in the preview time are both located within a third distance threshold on the left side of the effective lane line on the left side of the host vehicle is determined as an effective vehicle on the left side of the host vehicle. A vehicle of which the lateral position at the current time and the vehicle lateral position of the preview time are both within a fourth distance threshold on the right side of the effective lane line on the right side of the host vehicle is determined as an effective vehicle on the right side of the host vehicle. Herein, the direction change of the host vehicle may include a turn of the host vehicle or a lane change of the host vehicle. The determining an effective lane line means that the lane line of the lane in which the host vehicle is located acquired when the host vehicle changes directions is credible, that is, that the lane line of the lane in which the host vehicle is located can be acquired when the host vehicle changes directions, the lane line including a left lane line and a right lane line. Thus, it is avoided that the division result of the effective vehicle jumps when the host vehicle changes directions, and ensures that the congestion state of the target lane determined during the host vehicle changing directions remains unchanged, which plays a buffering role in determining the congestion state, so that the host vehicle changes directions smoothly.

Step 203 may be performed by the effective vehicle determination unit in the embodiment of the present disclosure. Specifically, Step 2031 may be performed by the effective vehicle determination subunit, and Step 2032 may be performed by the effective vehicle division subunit. What is not described in detail in Step 203 may be referred to the relevant description of the effective vehicle determination unit and each subunit thereof in the above-embodiment, and will not be described in detail herein.

Step 204, determining a current congestion state of a corresponding lane based on vehicle information of the effective vehicle on at least one side of the host vehicle and a historical congestion state of the corresponding lane.

In some embodiments, the determining a current congestion state of a corresponding lane based on vehicle information of the effective vehicle on at least one side of the host vehicle and a historical congestion state of the corresponding lane may include the following steps 2041 to 2043.

Step 2041, determining the number, an average vehicle speed, and an average vehicle distance of the effective vehicles on a corresponding lane based on the vehicle information of effective vehicles on at least one side of the host vehicle.

In some embodiments, it may be determined that the effective vehicle on the left side of the host vehicle and/or the effective vehicle on the right side of the host vehicle based on the division results of the effective vehicles in the above-described embodiments, thereby determining the number of effective vehicles on the left lane and/or the right lane. Then, it calculates an average vehicle speed of the effective vehicles on the left and/or right side lanes based on the vehicle longitudinal speed of each effective vehicle on the left and/or right side lanes. Finally, it calculates the average vehicle distance of the effective vehicles on the left and/or right lanes based on the vehicle longitudinal position of each effective vehicle on the left and/or right lanes.

Step 2042, determining a congestion state switching result based on the number, the average vehicle speed and the average vehicle distance of the effective vehicles, and the historical congestion state, wherein the congestion state switching result represents a change in the congestion state.

In some embodiments, the congestion state includes a loss of judgment, a non-congestion, an impending congestion, a slight congestion, a medium congestion, a heavy congestion and a severe congestion. Within each judgment period, the congestion state switching result comprises state holding, a loss of judgment, switching from the loss of judgment to the non-congestion, switching from the congestion to the non-congestion, switching from the slight congestion to the non-congestion, switching from the non-congestion to the impending congestion, switching from the slight congestion to the impending congestion, switching from the non-congestion to the slight congestion, switching from the impending congestion to the slight congestion, switching from the medium congestion to the slight congestion, switching from the slight congestion to the medium congestion, switching from the heavy congestion to the medium congestion, switching from the medium congestion to the heavy congestion, switching from the heavy congestion to the severe congestion, switching from the non-congestion to the heavy congestion, and switching from the heavy congestion to the severe congestion.

In the embodiment of the present disclosure, the abovementioned judgment period is a judgment period of a congestion state switching result, and the judgment period can be set and adjusted according to engineering experience. In each judgment period, only one congestion state switching result can exist. In some embodiments, each congestion state switching result may be determined sequentially in a pre-set order in each judgment period. When one congestion state switching result is determined, other congestion state switching results are not determined.

Specifically, after determining that the number of effective vehicles is less than 1, it is determined that the congestion state switching result is a loss of judgment.

The congestion state switching result is determined to be switching from the loss of judgment to the non-congestion after judging that the historical congestion state is the loss of judgment and the number of effective vehicles is greater than n1.

The congestion state switching result is determined to be switching from the impending congestion to the non-congestion after judging that the historical congestion state is the impending congestion, the number of the effective vehicles is less than n2, and the average vehicle speed is greater than that of the host vehicle speed by v1 or above.

The congestion state switching result is determined to be switching from the slight congestion to the non-congestion after judging that the historical congestion state is the slight congestion, the number of the effective vehicles is less than n3, the average vehicle distance is greater than L1, or the average vehicle speed is greater than v2.

The congestion state switching result is determined to be switching from the non-congestion to the impending congestion after judging that the historical congestion state is the non-congestion, the number of the effective vehicles is greater than n4, the relative longitudinal distance of the nearest effective vehicle is greater than L2, and the average vehicle speed is greater than that of the host vehicle height by v3 or above.

The congestion state switching result is determined to be switching from the slight congestion to the impending congestion after judging that the historical congestion state is the slight congestion and the relative longitudinal distance of the nearest effective vehicle is greater than L3.

The congestion state switching result is determined to be switching from the non-congestion to the slight congestion after judging that the historical congestion state is the non-congestion, the number of the effective vehicles is greater than n5, the average vehicle distance is less than L4, and the relative longitudinal distance of the nearest effective vehicle is less than L5.

The congestion state switching result is determined to be switching from the impending congestion to the slight congestion after judging that the historical congestion state is the impending congestion and the relative longitudinal distance of the nearest effective vehicle is less than L6.

The congestion state switching result is determined to be switching from the medium congestion to the slight congestion after judging that the historical congestion state is medium congestion, and the number of the effective vehicles is less than n6, or the average vehicle distance is greater than L7, or the average vehicle speed is greater than that of the host vehicle by v4 or above.

The congestion state switching result is determined to be switching from the slight congestion to the medium congestion after judging that the historical congestion state is a slight congestion, the number of the effective vehicles is greater than n7, the average vehicle distance is less than L8, and the average vehicle speed is less than v5.

The congestion state switching result is determined to be switching from the heavy congestion to the medium congestion after judging that the historical congestion state is the heavy congestion, the average vehicle distance is greater than L9, the number of the effective vehicles is less than n8, or the average vehicle speed is greater than that of the host vehicle by v6 or above.

The congestion state switching result is determined to be switching from the medium congestion to the heavy congestion after judging that the historical congestion state is the medium congestion, the number of the effective vehicles is greater than n9, the average vehicle distance is less than L10, and the average vehicle speed is less than v7.

The congestion state switching result is determined to be switching from the heavy congestion to the severe congestion after judging that the historical congestion state is the severe congestion, and the number of the effective vehicles is less than n10, or the average vehicle speed is greater than v8, or the average vehicle speed is greater than that of the host vehicle height by v9 or above.

The congestion state switching result is determined to be switching from the non-congestion to the heavy congestion after judging that the historical congestion state is the non-congestion, the number of the effective vehicles is greater than n11, and the average vehicle speed is less than v10.

The congestion state switching result is determined to be switching from the severe congestion to the heavy congestion after judging that the historical congestion state is the heavy congestion and the average vehicle speed is less than v11.

When none of the above conditions is satisfied, it is determined to the state holding (the congestion state switching result remains unchanged);

where n1-n11, L1-L10 and v1-v11 are system configuration parameters.

Step 2043, determining a current congestion state of the corresponding lane based on the congestion state switching result.

Specifically, the current congestion state is determined to be a loss of judgment after determining that the congestion state switching result is the loss of judgment.

One is added to a first counting module after judging that the current congestion state is switching from the loss of judgment to the non-congestion, switching from the impending congestion to the non-congestion, or switching from the slight congestion to the non-congestion; it is determined that the current congestion state is the non-congestion when a counting result continuously counted by the first counting module is greater than a first counting threshold value;
- one is added to a second counting module one after judging that the congestion state switching result is switching from the non-congestion to the impending congestion or switching from the slight congestion to the impending congestion; it is determined that the current congestion state is the impending congestion when a counting result continuously counted by the second counting module is greater than a second counting threshold value;
- one is added to a third counting module after judging that the congestion state switching result is switching from the non-congestion to the slight congestion, switching from the impending congestion to the slight congestion or switching from the medium congestion to the slight congestion; it is determined that the current congestion state is the slight congestion when a counting result continuously counted by the third counting module is greater than a third counting threshold value;
- one is added to a fourth counting module after judging that the congestion state switching result is switching from the slight congestion to the medium congestion or heavy congestion switches to medium congestion; it is determined that the current congestion state is switching from the heavy congestion to the medium congestion when a counting result continuously counted by the fourth counting module is greater than a fourth counting threshold value;
- one is added to a fifth counting module after judging that the congestion state switching result is switching from the medium congestion to the severe congestion or switching from the heavy congestion to the severe congestion; it is determined that the current congestion state is the severe congestion when a counting result continuously counted by the fifth counting module is greater than a fifth counting threshold value;
- one is added to a sixth counting module after judging that the congestion state switching result is switching from the non-congestion to the heavy congestion or switching from the severe congestion to the heavy congestion; it is determined that the current congestion state is the severe congestion when a counting result continuously counted by the sixth counting module is greater than a sixth counting threshold value;
- when none of the above conditions is satisfied, it is determined to the state holding (the current congestion state remains unchanged);
- wherein, in the case of non-state holding, only one counting module operates in each judgment period; and the counts of the other counting modules are reset when one counting module of the first counting module, the second counting module, the third counting module, the fourth counting module, the fifth counting module and the sixth counting module starts to count.

Step 204 may be performed by the congestion state determination unit in the embodiment of the present disclosure. Specifically, Step 2041 may be performed by the target information extraction subunit. Step 2042 may be performed by the congestion state switching judgment subunit. Step 2043 may be performed by the congestion state determination subunit. For the contents not described in detail in step 203, reference may be made to the description of the congestion state determination unit and each subunit thereof in the above-mentioned embodiment, and the description thereof will not be repeated here.

In some embodiments, after determining the current congestion state based on the driving environment information and the historical congestion state, it further includes storing a current congestion state; and taking the current congestion state as a historical congestion state for a next judgment period. Thus, the real-time updating of the historical congestion state is implemented to ensure the accuracy of the judgment of the congestion state switching result, and then the current congestion state is accurately obtained.

In some embodiments, the initial historical congestion state is a loss of judgment. At this time, when the traffic congestion sensing function is activated, the default historical congestion state is a loss of judgment. In conjunction with the method for determining a congestion state switching result in the above-mentioned solution, in the first judgment period, the historical congestion state is a loss of judgment. Generally speaking, when an unmanned vehicle starts up, a traffic congestion sensing function will be started. At this time, a congestion state will generally not exist in a lane, and there are fewer vehicles on adjacent lanes, satisfying the judgment condition that "the congestion state switching result is switching from the loss of judgment to the non-congestion", namely, "judging that the historical congestion state is the loss of judgment and the number of effective vehicles is greater than n1". At this time, according to the above-mentioned judgment method for the current congestion state, after a plurality of successive judgment periods are passed, the condition that "one is added to a first counting module after judging that the current congestion state is switching from the loss of judgment to the non-congestion, switching from the impending congestion to the non-congestion, or switching from the slight congestion to the non-congestion; when a counting result continuously counted by the first counting module is greater than a first counting threshold value" is satisfied so as to determine that the current congestion state is the non-congestion, i.e., the initial historical congestion state can be updated so as to make the subsequent congestion state switching result reliable and effective. It should be noted that the initial historical congestion state cannot be judged to be only an alternative embodiment of the present disclosure. In other embodiments, the initial historical congestion state may also be any congestion state set in the present disclosure, such as a non-congestion, i.e., an impending congestion and a slight congestion.

In summary, the method for sensing a traffic congestion provided by the embodiments of the present disclosure, which is performed by the device for sensing the traffic congestion provided by the embodiments of the present disclosure, has the same functions and advantageous effects. Reference can be made to the embodiments of the device for sensing the traffic congestion that are not described in detail in the embodiments of the method for sensing the traffic congestion.

Figure 8:
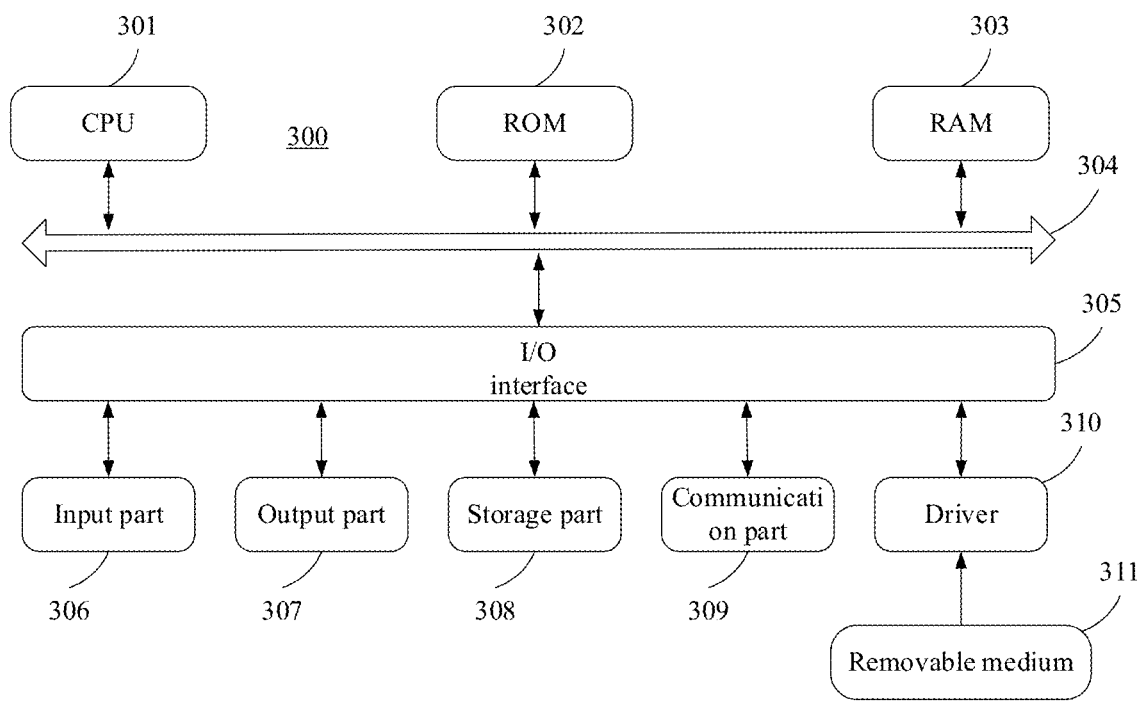
FIG. 8 illustrates a structure diagram of an electronic equipment suitable for implementing embodiments in accordance with the present disclosure.

FIG. 8 is a structure diagram of an electronic equipment suitable for implementing embodiments in accordance with the present disclosure. As shown in FIG. 8, the electronic device 300 includes a central processing unit (CPU) 301 that can perform various processes in the foregoing embodiments according to a program stored in a read-only memory (ROM) 302 or a program loaded from a storage part 308 into a random access memory (RAM) 303. In the RAM 303, various programs and data required for the operation of electronic equipment 300 are also stored. The CPU 301, the ROM 302 and the RAM 303 are connected to each other via a bus 304. An input/output (I/O) interface 305 is also connected to the bus 304.

The following components are connected to the I/O interface 305: an input part 306 including a keyboard, a mouse, etc.; an output part 307 such as a cathode ray tube (CRT), a liquid crystal display (LCD), etc. and a speaker, etc.; a storage part 308 including a hard disk, etc.; and a communication part 309 including a network interface card such as a LAN card, a modem, etc. The communication part 309 performs communication processing via a network such as the Internet. A driver 310 is also connected to the I/O interface 305 as needed. A removable medium 311, such as a magnetic disk, an optical disk, a magneto-optical disk, a semiconductor memory, or the like, is mounted on the driver 310 as so that a computer program read therefrom is mounted into the storage part 308 as required.

In particular, according to embodiments of the present disclosure, the methods described above may be implemented as a computer software program. For example, embodiments of the present disclosure include a computer program product having a computer program tangibly embodied on a medium readable thereby, the computer program including program code for performing the aforementioned obstacle avoidance method. In such an embodiment, the computer program may be downloaded and installed from the network via the communication part 309 and/or from the removable medium 311.

The flowcharts and block diagrams in the drawings illustrate the architecture, functionality, and operation of possible implementations of devices, methods, and computer program products according to various embodiments of the present disclosure. In this regard, each block in the roadmap or block diagram block may represent a module, a program segment, or part of code, which includes one or more executable instructions for implementing the specified logical functions. It should also be noted that in some alternative implementations, the functions noted in the blocks may occur differently than the order noted in the drawings. For example, two blocks represented in succession may, in fact, be executed substantially concurrently or they may sometimes be executed in the reverse order, depending upon the functionality involved. It is also noted that each block of the block diagrams and/or flowcharts, and combinations of blocks in the block diagrams and/or flowcharts, can be implemented by special purpose hardware-based systems which perform the specified functions or operations, or combinations of special purpose hardware and computer instructions.

The units or modules described in connection with the embodiments disclosed herein may be implemented as software or hardware. The units or modules described may also be provided in a processor, the name of which in some cases does not constitute a limitation on the unit or module itself.

In addition, the present disclosure also provides a computer-readable storage medium, which may be the computer-readable storage medium contained in the device described in the above embodiments. It may also be an individual and a computer-readable storage medium that is not incorporated into the device. The computer-readable storage medium stores one or more programs that are used by one or more processors to perform the methods described in this disclosure.

In summary, the present disclosure provides a method and a device for sensing a traffic congestion, electronic equipment and a storage medium, which can determine an effective vehicle on at least one side of the host vehicle based on driving environment information, and further determine a current congestion state of a corresponding lane based on the vehicle information of the effective vehicle on at least one side of the host vehicle and a historical congestion state of the corresponding lane thereof, so as to achieve the sensing of a real-time congestion state of an adjacent lane on the left side and/or the right side of the host vehicle. The sensing result is highly targeted, and can provide a better service for the driving (especially automatic driving) of the host vehicle. In the process of sensing the congestion state of at least one lane of the host vehicle, the driving environment data can be collected via the host vehicle sensing system, and the driving environment information can be obtained by this processing, so that it is not dependent on the road infrastructure and the central system, reducing costs. Moreover, it does not need a lot of other vehicle information to be collected and calculated, which improves the real time of the host vehicle congestion sensing, promotes the host vehicle to change lanes in time, and avoids missing the opportunity of lane change. At the same time, the determined current congestion state has a strong correlation with the driving demand of the host vehicle. Namely, the congestion sensing can be performed on any driving section to determine the current congestion state, which solves the problem that congestion detection can only be performed on a specific section due to the limitation of road infrastructure setting in the existing scheme. The disclosed solution has strong universality.

The previous description of the disclosed embodiments is provided to enable any person skilled in the art to make or use the present disclosure. Various modifications to these embodiments will be readily apparent to those skilled in the art. The generic principles defined herein may be implemented in other embodiments without departing from the spirit or scope of the disclosure. Thus, the present disclosure is not intended to be limited to the embodiments shown herein but accords with the widest scope consistent with the principles and novel features disclosed herein.

INDUSTRIAL APPLICABILITY

The present disclosure provides a method for sensing a traffic congestion, which enables a real-time congestion state of an adjacent lane on the left side and/or the right side of a host vehicle to be targetedly sensed in terms of an autonomous lane change of an autonomous vehicle. The detection result of the congestion state is accurate and has strong industrial applicability.

What is claimed is:

1. A method for sensing a traffic congestion, comprising:
acquiring driving environment information comprising lane line information of a lane in which a host vehicle is located, host vehicle driving information, and vehicle information of surrounding vehicles;

determining a driving path of the host vehicle based on the lane line information and the host vehicle driving information;
determining an effective vehicle on at least one side of the host vehicle from the surrounding vehicles based on the host vehicle driving path and the vehicle information of the surrounding vehicles; and
determining a current congestion state of a corresponding lane based on vehicle information of the effective vehicle on at least one side of the host vehicle and a historical congestion state of the corresponding lane;
wherein the lane line information comprises a lane line lateral position, a lane line slope, a lane line curvature, a lane line effective length, and a lane line confidence; the host vehicle driving information comprises a host vehicle steering wheel angle, a host vehicle yaw velocity and a host vehicle speed; the vehicle information of the surrounding vehicle comprises a vehicle longitudinal position, a vehicle lateral position, a vehicle longitudinal speed, a vehicle lateral speed, and a vehicle confidence;
wherein the determining a driving path of the host vehicle based on the lane line information and the host vehicle driving information comprises:
determining an effective lane line of a lane in which the host vehicle is located based on the lane line information;
determining a driving path curvature of the host vehicle based on the host vehicle driving information in combination with Kalman filtering;
determining a target path curvature of the host vehicle and a target path slope of the host vehicle based on the lane line slope and the lane line curvature of the effective lane line, and the driving path curvature of the host vehicle; and
determining the host vehicle driving path based on the target path curvature of the host vehicle and the target path slope of the host vehicle;
wherein the determining an effective vehicle on at least one side of the host vehicle from the surrounding vehicles based on the host vehicle driving path and the vehicle information of the surrounding vehicles comprises:
determining an effective vehicle from the surrounding vehicles based on the vehicle information of the surrounding vehicles; and
determining an effective vehicle on at least one side of the host vehicle based on the host vehicle driving path and the vehicle information of the effective vehicle;
wherein the determining an effective vehicle from the surrounding vehicles based on the vehicle information of the surrounding vehicles comprises:
determining that one or more vehicles are effective vehicles when the vehicle longitudinal position of the one or more vehicles corresponding to the vehicle information of the surrounding vehicles is within a first preset range, the vehicle lateral position thereof is within a second preset range, the vehicle longitudinal speed thereof is greater than a first speed threshold, and the vehicle confidence thereof is greater than a first confidence threshold.

2. The method for sensing the traffic congestion according to claim 1, wherein, when the host vehicle travels straight along a straight lane in which the host vehicle is located or the host vehicle changes directions and the effective lane line is determined to be failed, determining an effective vehicle based on at least one side of the host vehicle based on the host vehicle driving path and the vehicle information of the effective vehicle comprises:
determining a vehicle lateral position of the corresponding vehicle during a preview time based on the vehicle lateral speed in the vehicle information of the effective vehicle;
determining a vehicle of which the vehicle lateral position at a current moment and the vehicle lateral position in the preview time are both within a first distance threshold on the left side of the driving path of the host vehicle as an effective vehicle on the left side of the host vehicle; and
determining a vehicle of which the vehicle lateral position at a current time and the vehicle lateral position in the preview time are both within a second distance threshold on the right side of the driving path of the host vehicle as an effective vehicle on the right side of the host vehicle.

3. The method for sensing the traffic congestion according to claim 1, wherein when the vehicle changes directions and the effective lane line is determined, the method further comprises:
determining a vehicle lateral position of the corresponding vehicle during a preview time based on the vehicle lateral speed in the vehicle information of the effective vehicle;
determining a vehicle of which the vehicle lateral position at a current moment and the vehicle lateral position in the preview time are both within a third distance threshold on the left side of the effective lane line on the left side of the host vehicle as an effective vehicle on the left side of the host vehicle; and
determining a vehicle of which the vehicle lateral position at a current time and the vehicle lateral position in the preview time are both within a fourth distance threshold on the right side of the effective lane line on the right side of the host vehicle as an effective vehicle on the right side of the host vehicle.

4. The method for sensing the traffic congestion according to claim 1, wherein the determining a current congestion state of a corresponding lane based on vehicle information of the effective vehicle on at least one side of the host vehicle and a historical congestion state of the corresponding lane comprises:
determining a number, an average vehicle speed, and an average vehicle distance of the effective vehicles on a corresponding lane based on the vehicle information of effective vehicles on at least one side of the host vehicle;
determining a congestion state switching result based on the number, the average vehicle speed and the average vehicle distance of the effective vehicles, and the historical congestion state, wherein the congestion state switching result represents a change in the congestion state; and
determining a current congestion state of the corresponding lane based on the congestion state switching result.

5. The method for sensing the traffic congestion according to claim 4, wherein the congestion state comprises a loss of judgment, a non-congestion, an impending congestion, a slight congestion, a medium congestion, a heavy congestion and a severe congestion;
within each judgment period, the congestion state switching result comprises state holding, a loss of judgment, switching from the loss of judgment to the non-congestion, switching from the congestion to the non-congestion, switching from the slight congestion to the non-congestion, switching from the non-congestion to the impending congestion, switching from the slight congestion to the impending congestion, switching from the non-congestion to the slight congestion, switching from the impending congestion to the slight congestion, switching from the medium congestion to the slight congestion, switching from the slight congestion to the medium congestion, switching from the heavy congestion to the medium congestion, switching from the medium congestion to the heavy congestion, switching from the heavy congestion to the severe congestion, switching from the non-congestion to the heavy congestion, and switching from the heavy congestion to the severe congestion.

6. The method for sensing the traffic congestion according to claim 1, wherein, after determining the current congestion state based on the driving environment information and the historical congestion state, the method further comprises:
storing the current congestion state; and
taking the current congestion state as the historical congestion state of the next judgment period.

7. The method for sensing the traffic congestion according to claim 1, wherein the driving environment information is obtained by processing data collected by a sensing system of the host vehicle, the sensing system comprising a camera, a steering wheel angle sensor, a yaw velocity sensor, and a vehicle speed sensor.

8. A non-transitory computer-readable storage medium having stored thereon computer-executable instructions, wherein the computer-executable instructions, when executed by a computing device, are operable to implement the method for sensing the traffic congestion according to claim 1.

9. An electronic equipment, comprising:
a memory and one or more processors;
wherein the memory is communicatively connected to the one or more processors; the memory stores instructions executable by the one or more processors; and when the instructions are executed by the one or more processors, the electronic equipment is used for implementing the method for sensing the traffic congestion according to claim 1.

10. The electronic equipment according to claim 9, wherein, when the host vehicle travels straight along a straight lane in which the host vehicle is located or the host vehicle changes directions and the effective lane line is determined to be failed, determining an effective vehicle based on at least one side of the host vehicle based on the host vehicle driving path and the vehicle information of the effective vehicle comprises:
determining a vehicle lateral position of the corresponding vehicle during a preview time based on the vehicle lateral speed in the vehicle information of the effective vehicle;
determining a vehicle of which the vehicle lateral position at a current moment and the vehicle lateral position in the preview time are both within a first distance threshold on the left side of the driving path of the host vehicle as an effective vehicle on the left side of the host vehicle; and
determining a vehicle of which the vehicle lateral position at a current time and the vehicle lateral position in the preview time are both within a second distance threshold on the right side of the driving path of the host vehicle as an effective vehicle on the right side of the host vehicle.

11. The electronic equipment according to claim 9, wherein when the vehicle changes directions and the effective lane line is determined, the method further comprises:
determining a vehicle lateral position of the corresponding vehicle during a preview time based on the vehicle lateral speed in the vehicle information of the effective vehicle;
determining a vehicle of which the vehicle lateral position at a current moment and the vehicle lateral position in the preview time are both within a third distance threshold on the left side of the effective lane line on the left side of the host vehicle as an effective vehicle on the left side of the host vehicle; and
determining a vehicle of which the vehicle lateral position at a current time and the vehicle lateral position in the preview time are both within a fourth distance threshold on the right side of the effective lane line on the right side of the host vehicle as an effective vehicle on the right side of the host vehicle.

12. The electronic equipment according to claim 9, wherein the determining a current congestion state of a corresponding lane based on vehicle information of the effective vehicle on at least one side of the host vehicle and a historical congestion state of the corresponding lane comprises:
determining a number, an average vehicle speed, and an average vehicle distance of the effective vehicles on a corresponding lane based on the vehicle information of effective vehicles on at least one side of the host vehicle;
determining a congestion state switching result based on the number, the average vehicle speed and the average vehicle distance of the effective vehicles, and the historical congestion state, wherein the congestion state switching result represents a change in the congestion state; and
determining a current congestion state of the corresponding lane based on the congestion state switching result.

13. The electronic equipment according to claim 12, wherein the congestion state comprises a loss of judgment, a non-congestion, an impending congestion, a slight congestion, a medium congestion, a heavy congestion and a severe congestion;
within each judgment period, the congestion state switching result comprises state holding, a loss of judgment, switching from the loss of judgment to the non-congestion, switching from the congestion to the non-congestion, switching from the slight congestion to the non-congestion, switching from the non-congestion to the impending congestion, switching from the slight congestion to the impending congestion, switching from the non-congestion to the slight congestion, switching from the impending congestion to the slight congestion, switching from the medium congestion to the slight congestion, switching from the slight congestion to the medium congestion, switching from the heavy congestion to the medium congestion, switching from the medium congestion to the heavy congestion, switching from the heavy congestion to the severe congestion, switching from the non-congestion to the heavy congestion, and switching from the heavy congestion to the severe congestion.

14. The electronic equipment according to claim 9, wherein, after determining the current congestion state based on the driving environment information and the historical congestion state, the method further comprises:
storing the current congestion state; and taking the current congestion state as the historical congestion state of the next judgment period.

15. The electronic equipment according to claim 9, wherein the driving environment information is obtained by processing data collected by a sensing system of the host vehicle, the sensing system comprising a camera, a steering wheel angle sensor, a yaw velocity sensor, and a vehicle speed sensor.

16. A device for sensing a traffic congestion, comprising:
an environment information acquisition unit configured for acquiring driving environment information comprising lane line information of a lane in which a host vehicle is located, host vehicle driving information, and vehicle information of surrounding vehicles;
a driving path determining unit configured for determining a driving path of the host vehicle based on the lane line information and the host vehicle driving information;
an effective vehicle determination unit configured for determining an effective vehicle on at least one side of the host vehicle from the surrounding vehicles based on the host vehicle driving path and the vehicle information of the surrounding vehicles; and
a congestion state determination unit configured for determining a current congestion state of a corresponding lane based on vehicle information of the effective vehicle on at least one side of the host vehicle and a historical congestion state of the corresponding lane;
wherein the lane line information comprises a lane line lateral position, a lane line slope, a lane line curvature, a lane line effective length, and a lane line confidence; the host vehicle driving information comprises a host vehicle steering wheel angle, a host vehicle yaw velocity and a host vehicle speed; the vehicle information of the surrounding vehicle comprises a vehicle longitudinal position, a vehicle lateral position, a vehicle longitudinal speed, a vehicle lateral speed, and a vehicle confidence;
wherein the determining a driving path of the host vehicle based on the lane line information and the host vehicle driving information comprises:

determining an effective lane line of a lane in which the host vehicle is located based on the lane line information;
determining a driving path curvature of the host vehicle based on the host vehicle driving information in combination with Kalman filtering;
determining a target path curvature of the host vehicle and a target path slope of the host vehicle based on the lane line slope and the lane line curvature of the effective lane line, and the driving path curvature of the host vehicle; and
determining the host vehicle driving path based on the target path curvature of the host vehicle and the target path slope of the host vehicle;
wherein the determining an effective vehicle on at least one side of the host vehicle from the surrounding vehicles based on the host vehicle driving path and the vehicle information of the surrounding vehicles comprises:
determining an effective vehicle from the surrounding vehicles based on the vehicle information of the surrounding vehicles; and
determining an effective vehicle on at least one side of the host vehicle based on the host vehicle driving path and the vehicle information of the effective vehicle;
wherein the determining an effective vehicle from the surrounding vehicles based on the vehicle information of the surrounding vehicles comprises:
determining that one or more vehicles are effective vehicles when the vehicle longitudinal position of the one or more vehicles corresponding to the vehicle information of the surrounding vehicles is within a first preset range, the vehicle lateral position thereof is within a second preset range, the vehicle longitudinal speed thereof is greater than a first speed threshold, and the vehicle confidence thereof is greater than a first confidence threshold.

* * * * *